United States Patent
Klemets et al.

(10) Patent No.: US 6,449,653 B2
(45) Date of Patent: *Sep. 10, 2002

(54) INTERLEAVED MULTIPLE MULTIMEDIA STREAM FOR SYNCHRONIZED TRANSMISSION OVER A COMPUTER NETWORK

(75) Inventors: Anders Edgar Klemets, Sunnyvale; Philip A. Chou, Menlo Park, both of CA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,345

(22) Filed: Mar. 25, 1997

(51) Int. Cl.[7] .............................................. G06F 15/16
(52) U.S. Cl. ..................... 709/231; 709/232; 709/236; 709/217; 709/219; 709/242; 348/423.1; 725/87; 370/470; 370/493; 370/503; 707/512
(58) Field of Search .......................... 370/79, 601, 431; 709/231, 203, 247, 248, 236, 232, 217, 234, 219; 348/423, 462, 512, 513, 515, 516; 725/2, 4, 87, 94, 101

(56) References Cited

U.S. PATENT DOCUMENTS

| | | | |
|---|---|---|---|
| 4,931,950 A | 6/1990 | Isle et al. .................... 364/513 |
| 5,050,161 A | 9/1991 | Golestani ..................... 370/60 |
| 5,119,474 A | 6/1992 | Beitel et al. ................. 395/154 |
| 5,274,758 A | 12/1993 | Beitel et al. ................. 395/154 |
| 5,313,454 A | 5/1994 | Bustini et al. ................ 370/13 |
| 5,396,497 A | * 3/1995 | Veltman ..................... 348/423 |
| 5,434,848 A | 7/1995 | Chimento, Jr. et al. ....... 370/17 |
| 5,442,389 A | * 8/1995 | Blahut et al. ................ 348/7 |
| 5,455,910 A | 10/1995 | Johnson et al. ............. 395/650 |
| 5,481,543 A | * 1/1996 | Veltman ..................... 370/473 |
| 5,487,167 A | 1/1996 | Dinallo et al. .............. 395/650 |
| 5,490,252 A | 2/1996 | Macera et al. ........... 395/200.1 |
| 5,502,727 A | * 3/1996 | Catanzaro et al. .......... 370/271 |
| 5,504,744 A | 4/1996 | Adams et al. ............. 370/60.1 |
| 5,512,938 A | * 4/1996 | Ohno .......................... 348/15 |
| 5,519,701 A | 5/1996 | Colmant et al. ........... 370/60.1 |
| 5,521,918 A | * 5/1996 | Kim .......................... 370/428 |
| 5,533,021 A | 7/1996 | Branstad et al. ........... 370/60.1 |
| 5,537,408 A | * 7/1996 | Branstad et al. ............ 370/473 |
| 5,566,175 A | 10/1996 | Davis .......................... 370/84 |
| 5,574,724 A | 11/1996 | Bales et al. ................ 370/68.1 |
| 5,577,258 A | 11/1996 | Cruz et al. .................. 395/800 |
| 5,583,652 A | * 12/1996 | Ware ........................... 386/75 |
| 5,594,911 A | 1/1997 | Cruz et al. .................. 395/800 |
| 5,600,775 A | 2/1997 | King et al. ................. 395/806 |

(List continued on next page.)

*Primary Examiner*—Mark H. Rinehart
*Assistant Examiner*—William C. Vaughn, Jr.
(74) *Attorney, Agent, or Firm*—Lee & Hayes, PLLC

(57) ABSTRACT

The production of an interleaved multimedia stream for servers and client computers coupled to each other by a diverse computer network which includes local area networks (LANs) and/or wide area networks (WANs) such as the internet. Interleaved multimedia streams can include compressed video frames for display in a video window, accompanying compressed audio frames and annotation frames. In one embodiment, a producer captures separate video/audio frames and generates an interleaved multimedia file. In another embodiment, the interleaved file include annotation frames which provide either pointer(s) to the event(s) of interest or include displayable data embedded within the annotation stream. The interleaved file is then stored in the web server for subsequent retrieval by client computer(s) in a coordinated manner, so that the client computer(s) is able to synchronously display the video frames and displayable event(s) in a video window and event window(s), respectively. In some embodiments, the interleaved file includes packets with variable length fields, each of which are at least one numerical unit in length.

16 Claims, 23 Drawing Sheets

U.S. PATENT DOCUMENTS

| | | | |
|---|---|---|---|
| 5,602,992 A | * 2/1997 | Danneels | 709/248 |
| 5,623,690 A | 4/1997 | Palmer et al. | 395/806 |
| 5,664,044 A | * 9/1997 | Ware | 386/75 |
| 5,717,854 A | 2/1998 | Egawa et al. | 395/200.2 |
| 5,754,938 A | 5/1998 | Herz et al. | 455/4.2 |
| 5,757,416 A | * 5/1998 | Birch et al. | 348/6 |
| 5,794,018 A | * 8/1998 | Vrvilo et al. | 713/400 |
| 5,796,743 A | 8/1998 | Bunting et al. | 370/474 |
| 5,801,781 A | * 9/1998 | Hiroshima et al. | 348/441 |
| 5,808,722 A | * 9/1998 | Suzuki | 352/12 |
| 5,884,004 A | * 3/1999 | Sato et al. | 386/98 |
| 5,916,307 A | * 6/1999 | Piskiel et al. | 709/314 |
| 5,936,945 A | 8/1999 | Shibata et al. | 370/260 |
| 5,956,088 A | * 9/1999 | Shen et al. | 348/385 |
| 5,956,488 A | 9/1999 | Suzuki | 395/200.49 |
| 5,978,577 A | 11/1999 | Rierden et al. | 395/610 |
| 5,982,459 A | 11/1999 | Fandrianto et al. | 348/845.2 |
| 5,991,307 A | * 11/1999 | Komuro et al. | 370/473 |
| 5,995,650 A | * 11/1999 | Migdal et al. | 382/154 |
| 5,999,906 A | * 12/1999 | Mercs et al. | 704/500 |
| 6,002,394 A | 12/1999 | Schein et al. | 345/327 |
| 6,006,241 A | 12/1999 | Purnaveja et al. | 707/512 |
| 6,006,257 A | 12/1999 | Slezak | 709/219 |
| 6,014,701 A | 1/2000 | Chaddha | 709/226 |
| 6,029,045 A | 2/2000 | Picco et al. | 455/5.1 |
| 6,029,195 A | 2/2000 | Herz | 709/219 |
| 6,122,658 A | 9/2000 | Chaddha | 709/203 |
| 6,151,634 A | * 11/2000 | Glaser et al. | 709/236 |

* cited by examiner

INTERLEAVED MULTIPLE MULTIMEDIA STREAM FOR SYNCHRONIZED TRANSMISSION OVER A COMPUTER NETWORK

RELATED APPLICATIONS

Pending U.S. patent application Ser. No. 08/818,804, entitled "Production of a Video Stream with Synchronized Annotations over a Computer Network", Attorney Docket Number VXT_703, assigned to VXtreme, Inc. and filed Mar. 14, 1997, is herein incorporated by reference in its entirety. Patent application Ser. No. 08/818,804 issued as U.S. Pat. No. 6,006,241 on Dec. 21, 1999, assignee Microsoft Corporation of Redmond, Wash.

BACKGROUND OF THE INVENTION

1. Field of the Invention

The present invention relates to multimedia communications. More particularly, the present invention relates to the delivery of an interleaved multimedia stream over a diverse computer network.

2. Description of the Related Art

With the proliferation of connections to the internet by a rapidly growing number of users, the viability of the internet as a widely accepted medium of communication has increased correspondingly. Bandwidth requirements can vary significantly depending on the type of multimedia data being delivered. For example, a low resolution, low frame rate video telephone call may require only an ISDN connection, while a high resolution video broadcast of a live event to a large group of viewers may require the bandwidth of a T1 connection. Hence, the ability to deliver of multimedia data over the internet is limited by bandwidth capacity and cost of the network connection and also by the computational capability of the server and client computers.

Pending patent application VXT_703 describes the production of separate video, audio and annotation streams for synchronous delivery from a stream server to a client computer. However, if the stream server is not available or not affordable to the end user at the client computer, then the client computer may only have access to web servers which are not designed to provide synchronous delivery capability of the separate video, audio and annotation streams.

In view of the foregoing, there are desired techniques for generating integrated multimedia content such as video and audio frames, for synchronous delivery from a web server client computer(s).

SUMMARY OF THE INVENTION

The present invention provides interleaved multimedia streams for servers and client computers coupled to each other by a diverse computer network which includes local area networks (LANs) and/or wide area networks (WANs) such as the internet. Interleaved multimedia streams can include compressed video frames for display in a video window, accompanying compressed audio frames and annotation frames.

In one embodiment, a producer captures separate video/audio frames and generates an interleaved multimedia file. In another embodiment, the interleaved file include annotation frames which provide either pointer(s) to the event(s) of interest or include displayable data embedded within the annotation stream. Accordingly, each annotation frame includes either an event locator or an event data. In addition, each annotation frame includes an event time marker which corresponds to the time stamp(s) of associated video frame(s) within the video stream.

The interleaved file is then stored in the web server for subsequent retrieval by client computer(s) in a coordinated manner, so that the client computer(s) is able to synchronously display the video frames and displayable event(s) in a video window and event window(s), respectively. In some embodiments, the interleaved file includes packets with variable length fields, each of which are at least one numerical unit in length.

These and other advantages of the present invention will become apparent upon reading the following detailed descriptions and studying the various figures of the drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
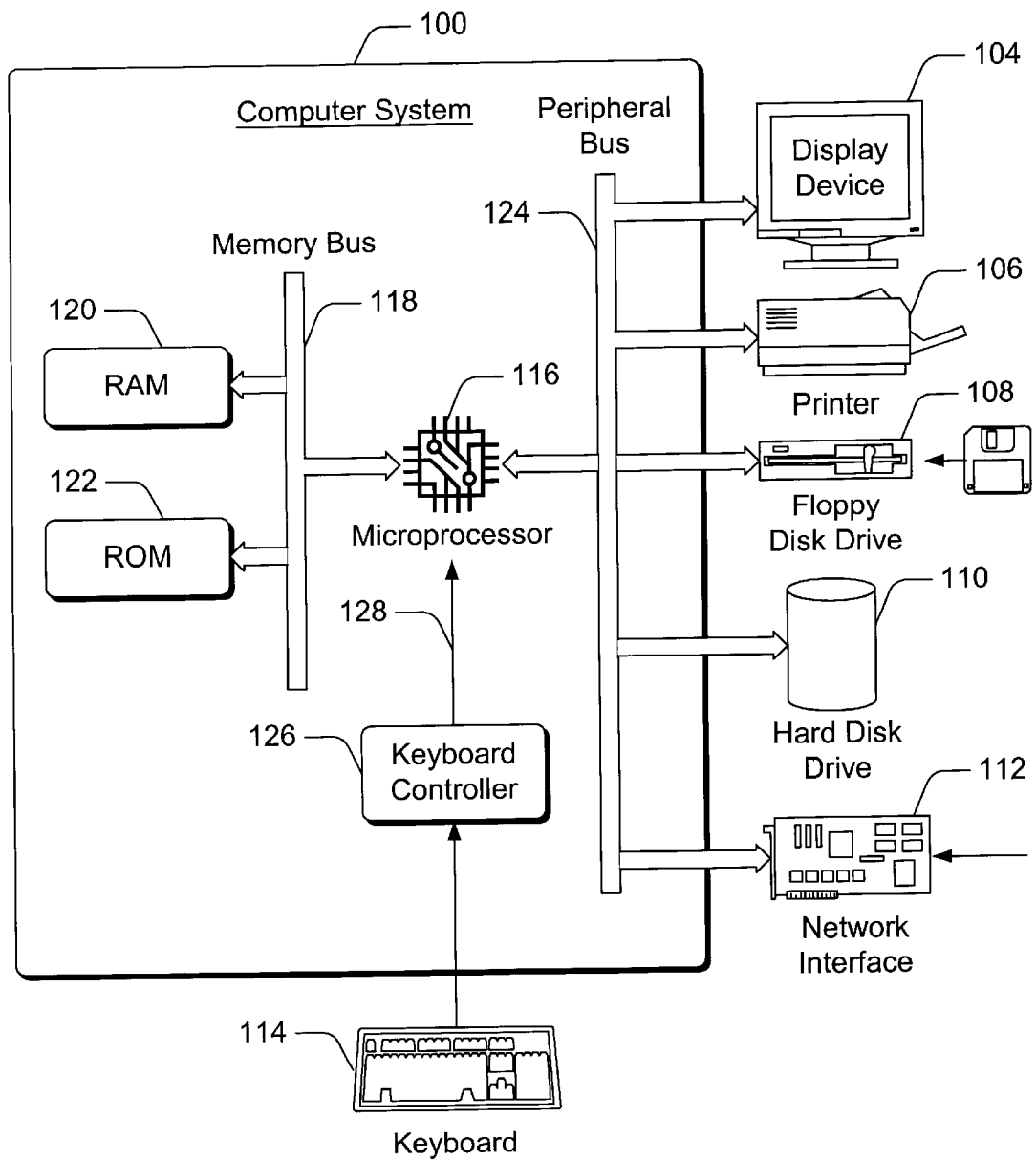
FIG. 1 is a block diagram of an exemplary computer system for practicing the various aspects of the present invention.

FIG. 1 is a block diagram of an exemplary computer system 100 for practicing the various aspects of the present invention. Computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

Microprocessor 116 is a general purpose digital processor which controls the operation of computer system 100. Microprocessor 116 can be a single-chip processor or can be implemented with multiple components. Using instructions retrieved from memory, microprocessor 116 controls the reception and manipulation of input data and the output and display of data on output devices.

Memory bus 118 is used by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 100. In the described embodiment(s), these devices include display screen 104, printer device 106, floppy disk drive 108, hard disk drive 110, and network interface 112. Keyboard controller 126 is used to receive input from keyboard 114 and send decoded symbols for each pressed key to microprocessor 116 over bus 128.

Display screen 104 is an output device that displays images of data provided by microprocessor 116 via peripheral bus 124 or provided by other components in computer system 100. Printer device 106 when operating as a printer provides an image on a sheet of paper or a similar surface. Other output devices such as a plotter, typesetter, etc. can be used in place of, or in addition to, printer device 106.

Floppy disk drive 108 and hard disk drive 110 can be used to store various types of data. Floppy disk drive 108 facilitates transporting such data to other computer systems, and hard disk drive 110 permits fast access to large amounts of stored data.

Microprocessor 116, together with an operating system, operate to execute computer code and produce and use data. The computer code and data may reside on RAM 120, ROM 122, or hard disk drive 110. The computer code and data could also reside on a removable program medium and loaded or installed onto computer system 100 when needed. Removable program mediums include, for example, CD-ROM, PC-CARD, floppy disk and magnetic tape.

Network interface circuit 112 is used to send and receive data over a network connected to other computer systems. An interface card or similar device and appropriate software implemented by microprocessor 116 can be used to connect computer system 100 to an existing network and transfer data according to standard protocols.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention can also be embodied as computer readable code on a computer readable medium. The computer readable medium is any data storage device that can store data which can thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

Figure 2:
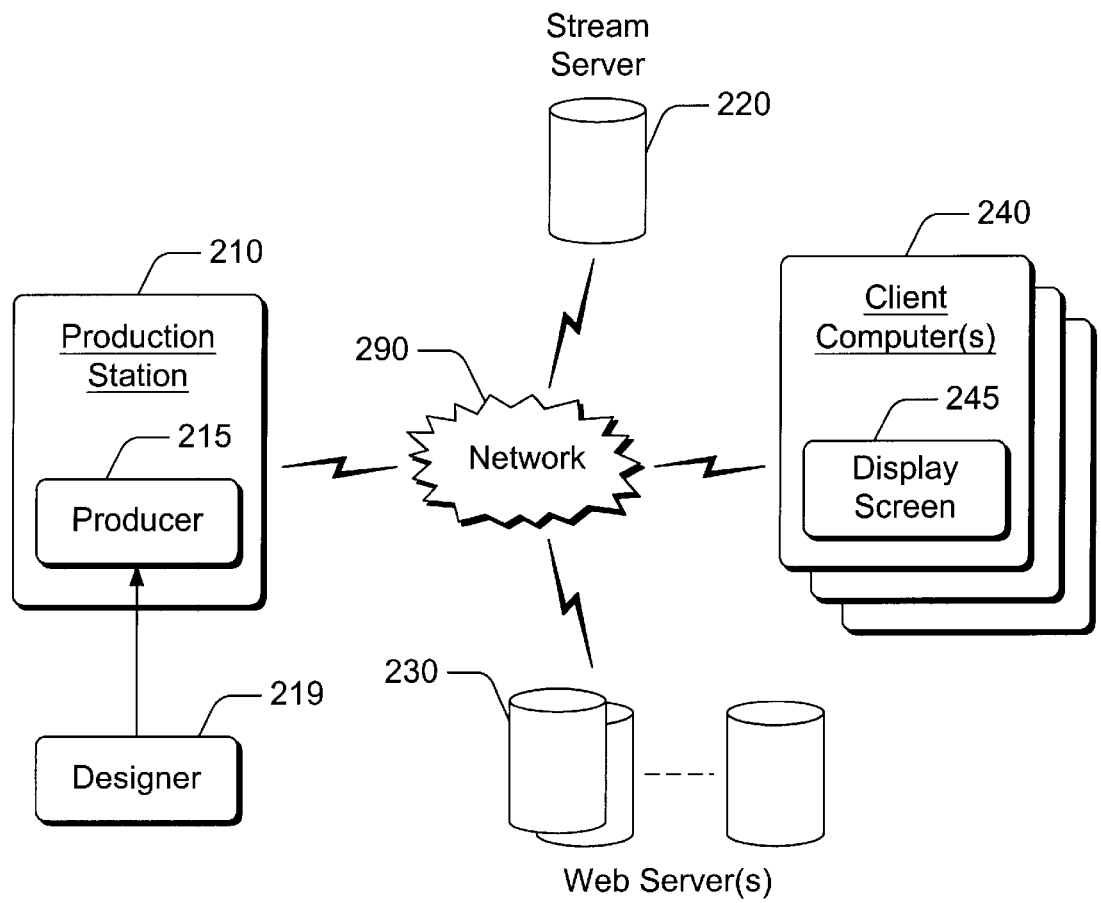
FIG. 2 is a block diagram showing an exemplary hardware environment for practicing the annotated video-on-demand (VOD) system of the present invention.

FIG. 2 is a block diagram showing an exemplary hardware environment for practicing the annotated video-on-demand (VOD) system of the present invention. The VOD system includes a production station 210, a stream server 220, at least one web server 230 and at least one client computer 240, each of which can be implemented using computer system 100 described above. Stream server 220 and web server 230 are coupled to client computer 240 via a computer network 290, e.g., the internet. Note that the disclosed hardware environment is exemplary. For example, production station 210 and stream server 220 can be implemented using two separate computer systems or using one computer system. In addition, if production station 210 and stream server 220 are implemented on separate computer systems as shown in FIG. 2, an optional direct connection (not shown) between production station 210 and stream server 220 can provide faster uploads of compressed video and annotation streams. In the following description, an audio stream optionally accompanies each video stream.

A producer 215, installed in production station 210, is a user-friendly tool for use by a designer 219 to create a synchronization script which includes annotation stream(s). The annotation stream(s) define the content(s) of a Live-Screen display 245 to be displayed on client computer 240 for a viewer. LiveScreen display 245 provides a graphical user interface (GUI) with multiple windows for synchronously displaying a video stream from stream server 220 and at least one displayable event stream. Examples of displayable events include textual/graphical information such as HTML-scripted web page(s) from web server 230.

Figure 3A:
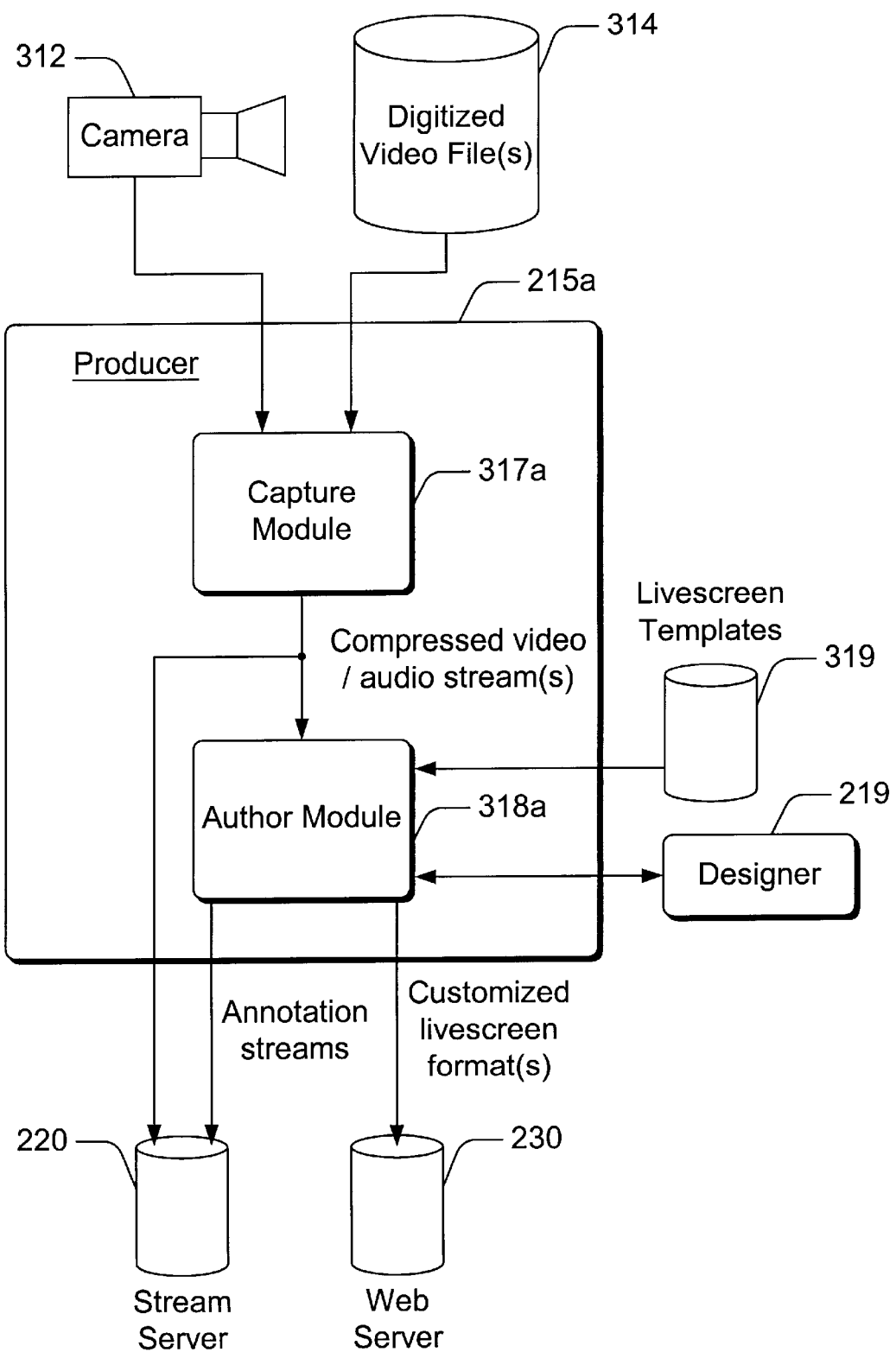
FIG. 3A shows one embodiment of a producer which includes a capture module and an author module.

In one embodiment, as shown in FIG. 3A, producer 215a includes a capture module 317a and an author module 318a.

Production station 210 includes 16 MB of RAM and a 1 GB hard disk drive for capturing and storing an uncompressed or precompressed video stream. Sources for generating video streams include a video camera 312, a video cassette recorder (VCR) (not shown) or a previously digitized video file 314, e.g., a Video for Windows (.avi) file. For ease of installation and use by designer 219, producer 215a is implemented in a host environment which includes a window-based operating system such as Microsoft Windows 95 and a web browser such as Netscape's Navigator 3.x.

Figure 4A:
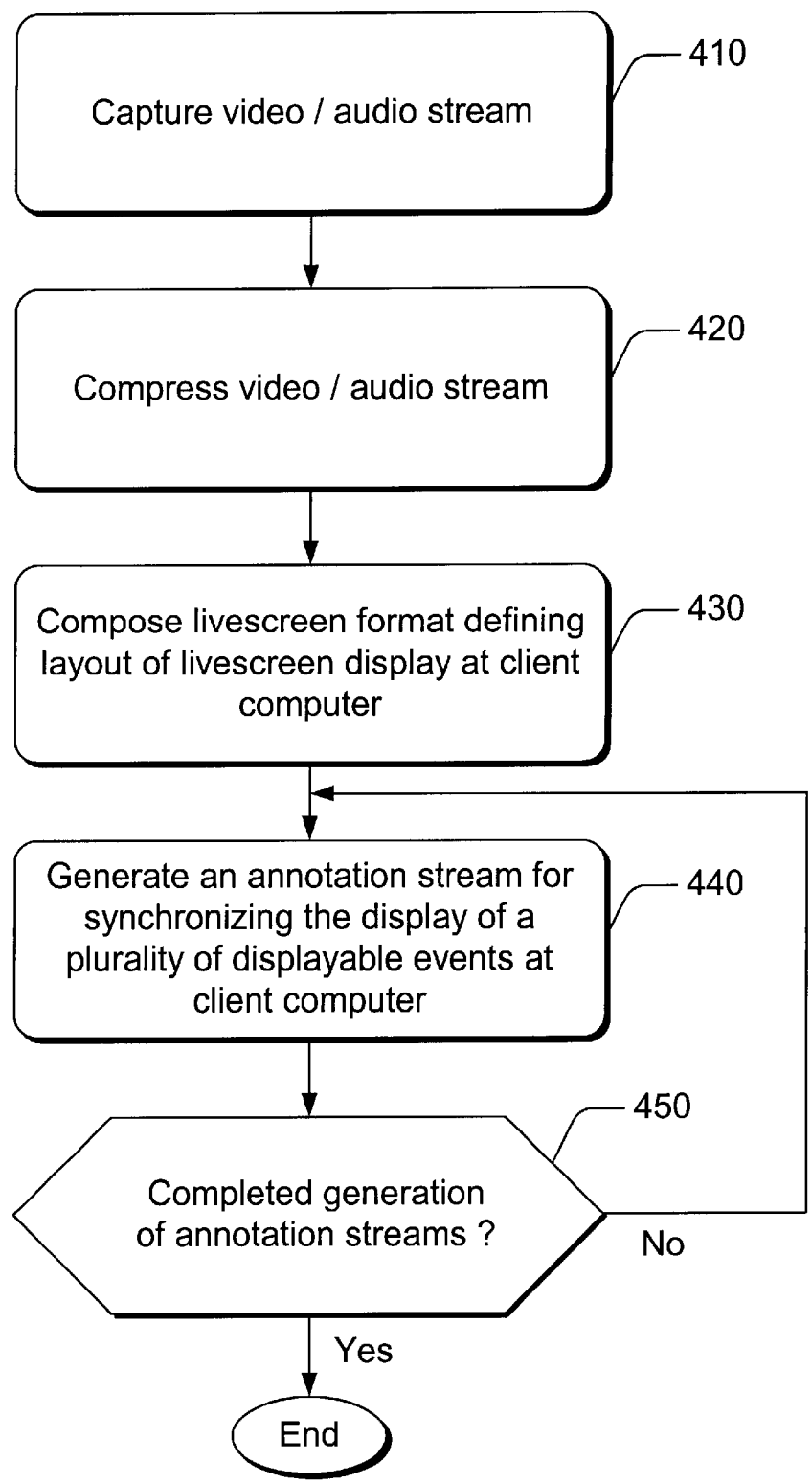
FIG. 4A is a flowchart illustrating the capture of a live video/audio stream from a video camera or from a previously stored video file.

Referring also to the flowchart of FIG. 4A, in step 410 capture module 317a captures a live video/audio stream from video camera 312 or from the previously stored video file 314. If video camera 312 provides an analog video stream, e.g., an NTSC signal, a hardware capture card (not shown) provides the required conversion from the analog video stream to a digitized video stream. Because temporary storage of uncompressed video data is memory intensive, some form of pre-compression can be used to reduce the memory storage requirement of the input video stream during capture step 410 and prior to compression step 420.

Figure 5:
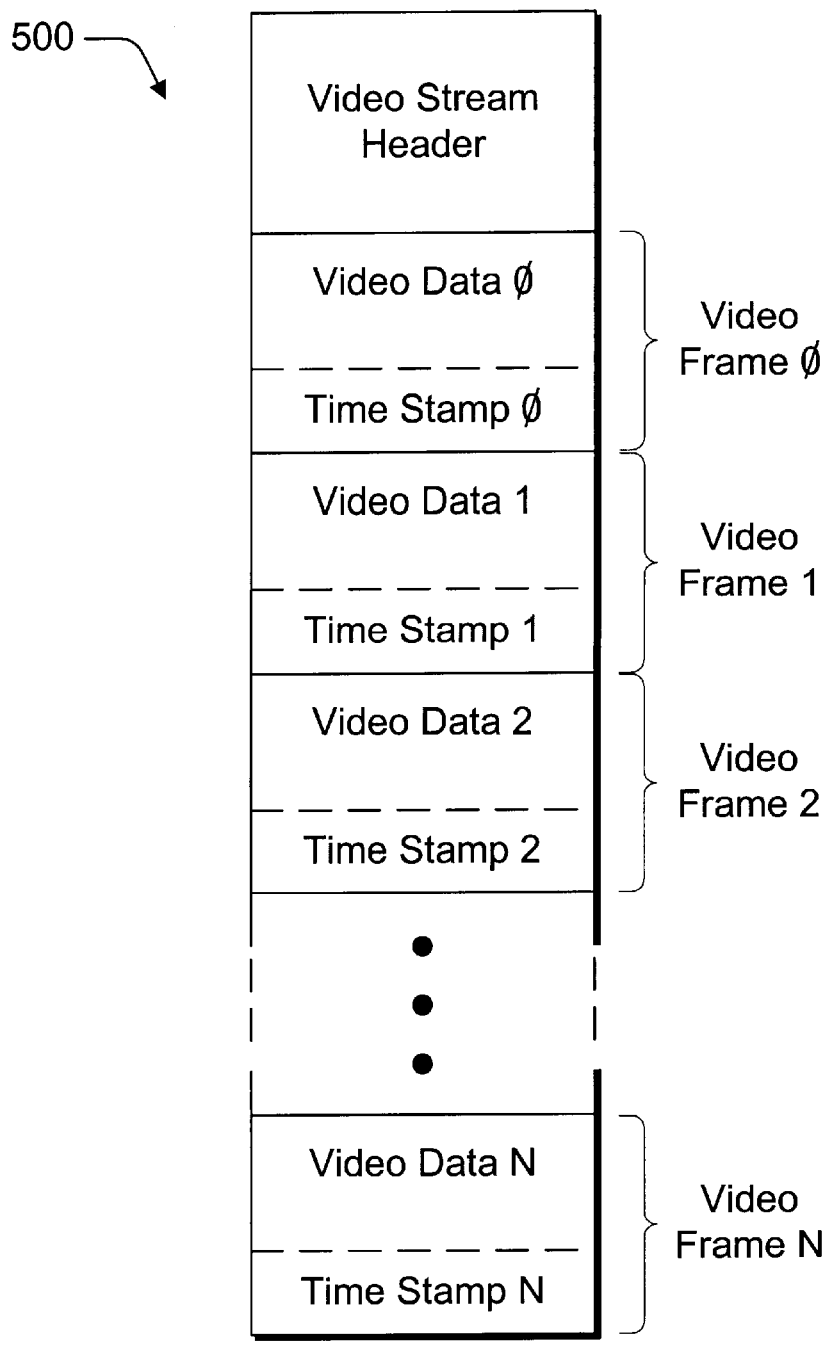
FIG. 5 shows an exemplary format for storing and delivering a compressed video stream.

In step 420, capture module 317a compresses the digitized video stream using a suitable compression technique. In this embodiment, depending on the bandwidth capacity of the connection provided by network 290 between stream server 220 and client computer 240, e.g., a POTS modem, ISDN or Ethernet, a suitable frame resolution and frame rate combination is selected. FIG. 5 shows an exemplary format 500 for storing and delivering a compressed video stream.

A similar format can also be used to store and deliver a separate compressed audio stream. It is also possible to combine, e.g., interleave a compressed video and audio data into one stream for delivery. Audio encoders/decoders (codecs) are available from a number of commercial sources. Examples include ToolVox from Voxware Inc., 305 College Road East, Princeton, N.J. 08540, and QCELP from QUALCOMM Inc., 10555 Sorrento Valley Road, San Diego, Calif. 92121.

Figure 6:
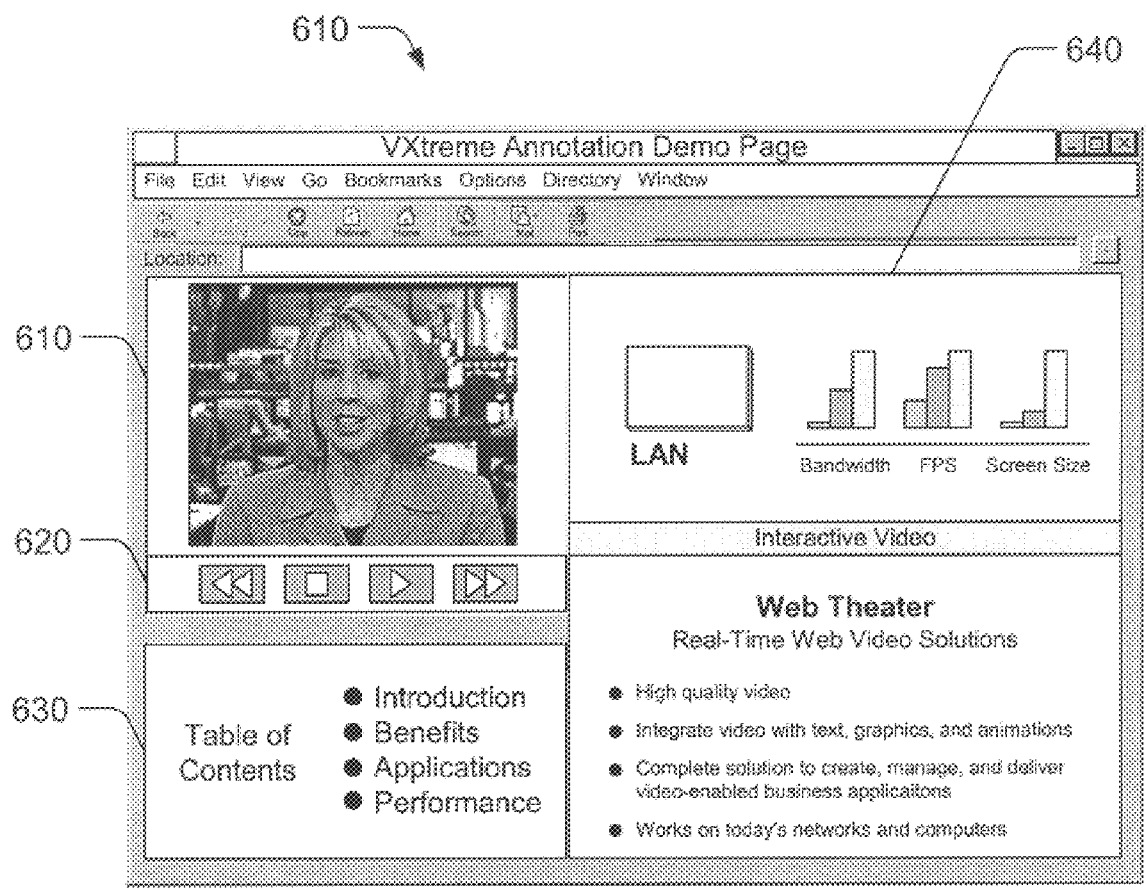
FIG. 6 shows an exemplary customized LiveScreen display which includes a video window, a set of VCR-like control buttons, a selectable table of contents (TOC) and an HTML page window.

Referring back to FIGS. 3A and 4A, in step 430, designer 219 uses author module 318a to compose a suitable LiveScreen display format which defines the layout of LiveScreen display 245 at client computer 240. FIG. 6 shows an exemplary customized LiveScreen display 600 which includes a video window 610, a set of VCR-like control buttons 620, a selectable table of contents (TOC) 630 and an HTML page window 640. Examples of other displayable event windows include but are not limited to ticker tape windows (not shown). In this implementation, LiveScreen templates 319 are available for designer 219 to use as starting points for composing customized LiveScreen formats.

Figure 7:
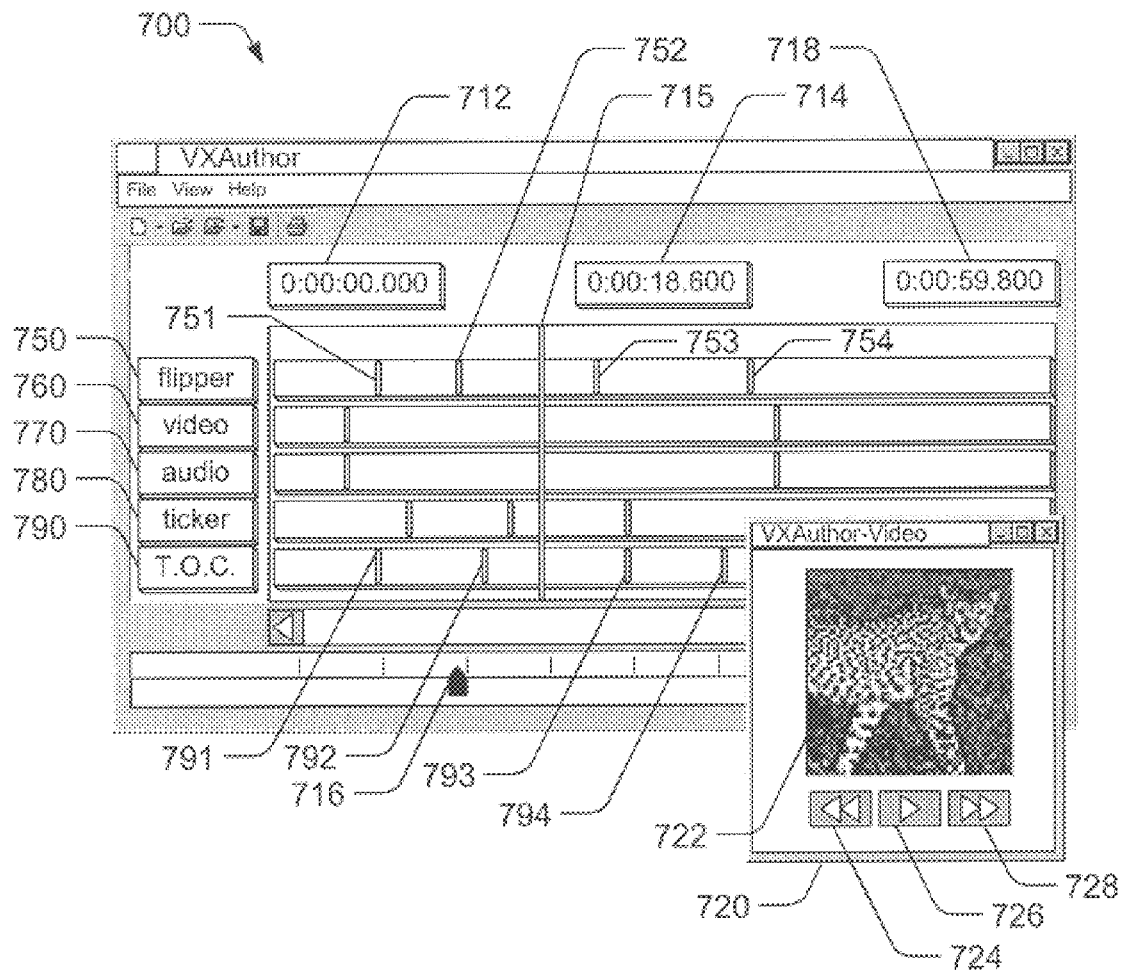
FIG. 7 illustrates an author tool provided by an author module for the designer to visually create annotation streams.

FIG. 7 illustrates an author tool 700 provided by author module 318a for designer 219 to visually creating annotation streams (step 440). There are two types of annotation streams. The first type of annotation streams are data annotation streams in which the displayable event data are embedded within the annotation streams. Examples of data annotation streams include ticker annotation streams which include ticker tape data embedded within the annotation stream. The second type of annotation streams are locator annotation streams in which the displayable data is either too cumbersome and/or is continually evolving to be embedded as static data within the annotation stream. Instead, event locator(s) pointing to the location of the displayable data are stored in the annotation streams instead of the displayable data. Examples include URL addresses pointing to HTML pages.

Designer 219 may view frames from video stream 500 displayed in video window 720 for referencing and selecting appropriate time stamps to use in generating annotation streams. Within video window 720, VCR function buttons, e.g., a rewind button 724, a play button 726 and a fast forward button 728, are available for designer 219 to quickly traverse video stream 500. Since video window 720 is provided as a convenience for designer 219, if designer 219 has prior knowledge of the content of the video stream, designer 219 may proceed with the generation of the annotation streams without viewing video window 720.

As shown in FIG. 7, author tool 700 displays a flipper time track 750, a video time track 760, an audio time track 770, a ticker time track 780 and a table of contents (TOC) time track 790. Flipper time track 750 and ticker time track 780 aid designer 219 in generating a flipper annotation stream and a ticker annotation stream, respectively. Another visual control aid, zoom bar 716, enables designer 219 to select the respective portions of the complete time tracks 750, 760, 770, 780 and 790, as defined by start time indicator 712 and end time indicator 718, which is currently displayed by author tool 700.

In accordance with one aspect of the invention, annotation frames are generated by designer 219 to form customized annotation streams (step 440). A time hairline 715 spanning time tracks 750, 760, 770, 780 and 790 provides designer 219 with a visual aid to select an appropriate time, displayed in time indicator 714, for synchronizing a displayable event. The exemplary format of time indicators 712, 714 and 718 are "hours:minutes:seconds".

Figure 4B:
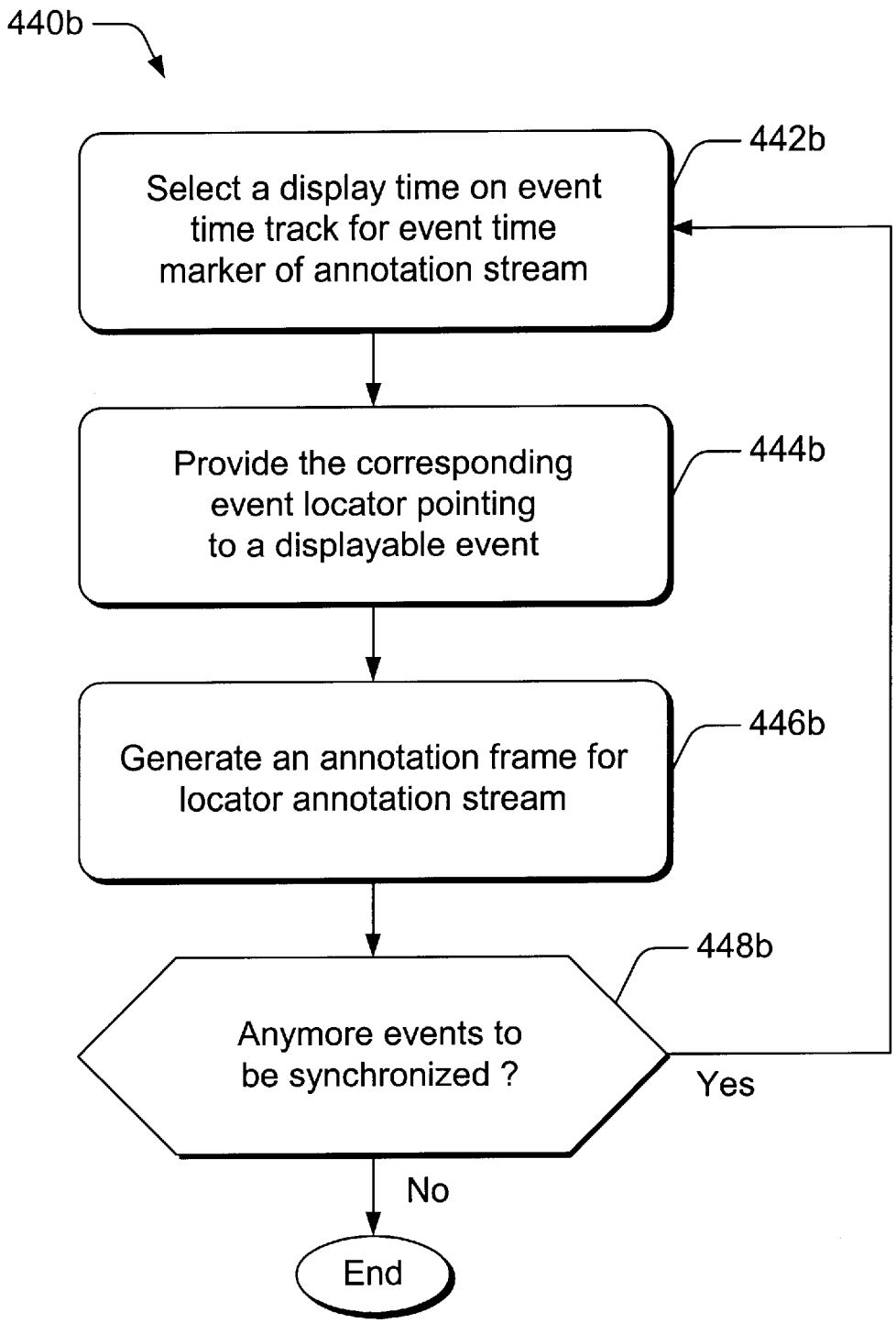
FIGS. 4B and 4C are flowcharts illustrating a locator annotation stream and a data annotation stream, respectively.
Figure 8A:
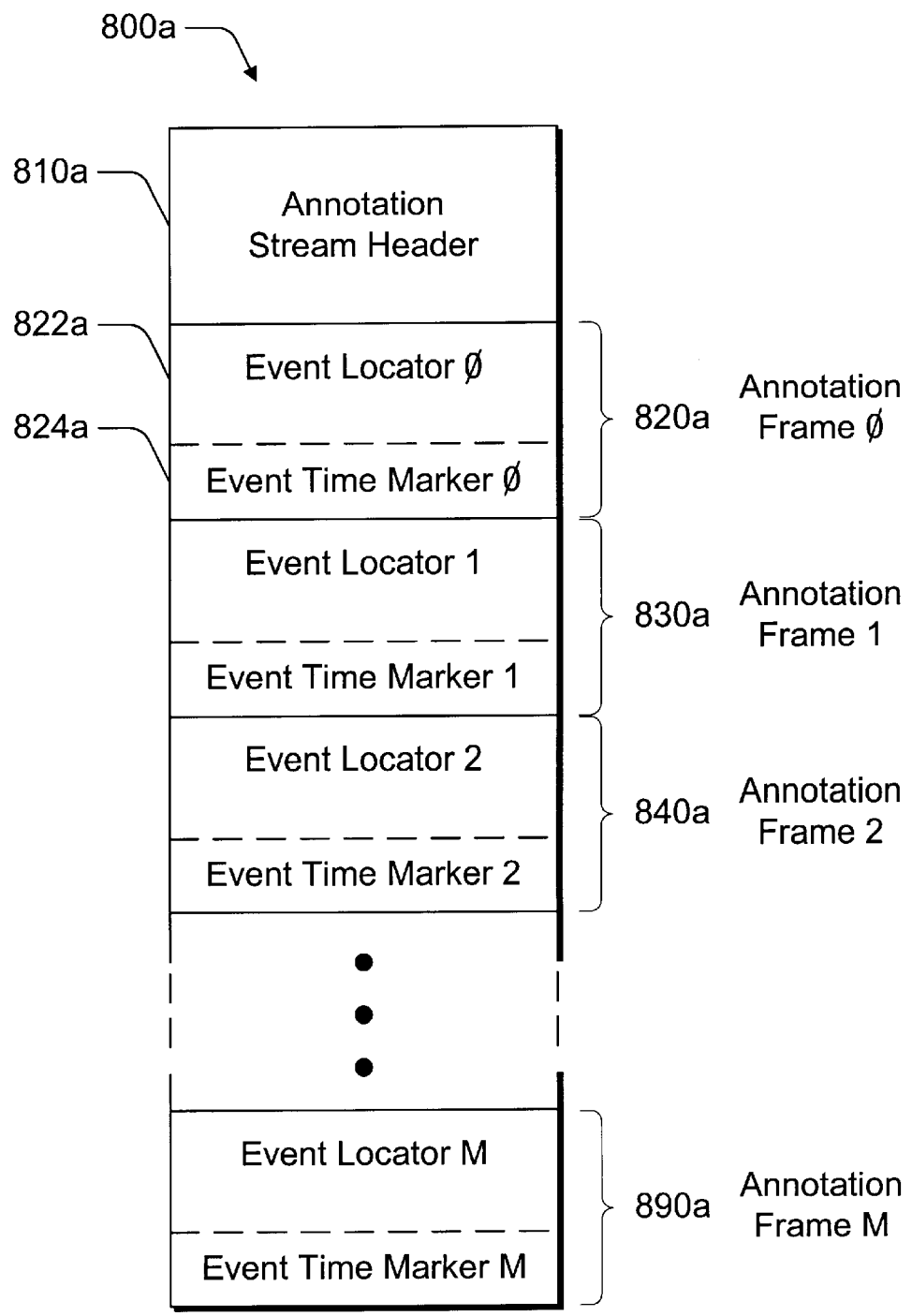
FIGS. 8A and 8B are exemplary formats illustrating a locator annotation stream and a data annotation stream, respectively.

FIGS. 4B and 8A are a flowchart and an exemplary format, respectively, illustrating a locator annotation stream 800a. Locator annotation stream 800a includes an annotation stream header 810a, and a plurality of annotation frames 820a, 830a, 840a, . . . 890a. Each annotation frame includes an event locator and an event time marker, e.g., annotation frame 820a includes event locator 822a and event time marker 824a. One example of a locator annotation stream is a flipper stream. Flipper time track 750 provides a convenient way to select suitable event time marker values, e.g., flipper time markers 751, 752, 753, 754, for the respective event locators. For example, URL addresses (event locators) pointing to HTML pages enable client computer 240 to subsequently retrieve textual and/or graphical elements to be displayed at predetermined time as defined by the time markers of the flipper stream.

Figure 4C:
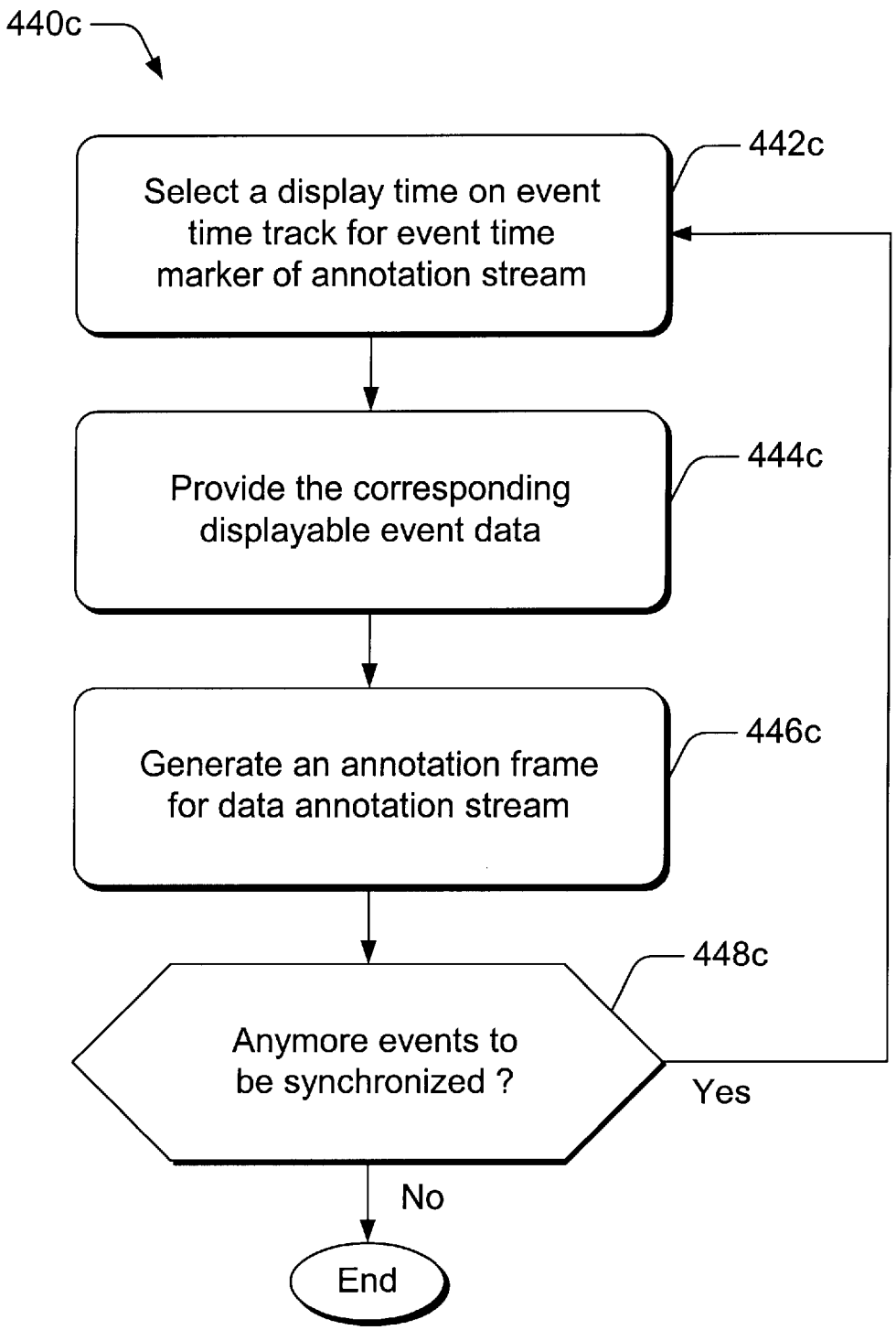
Figure 8B:
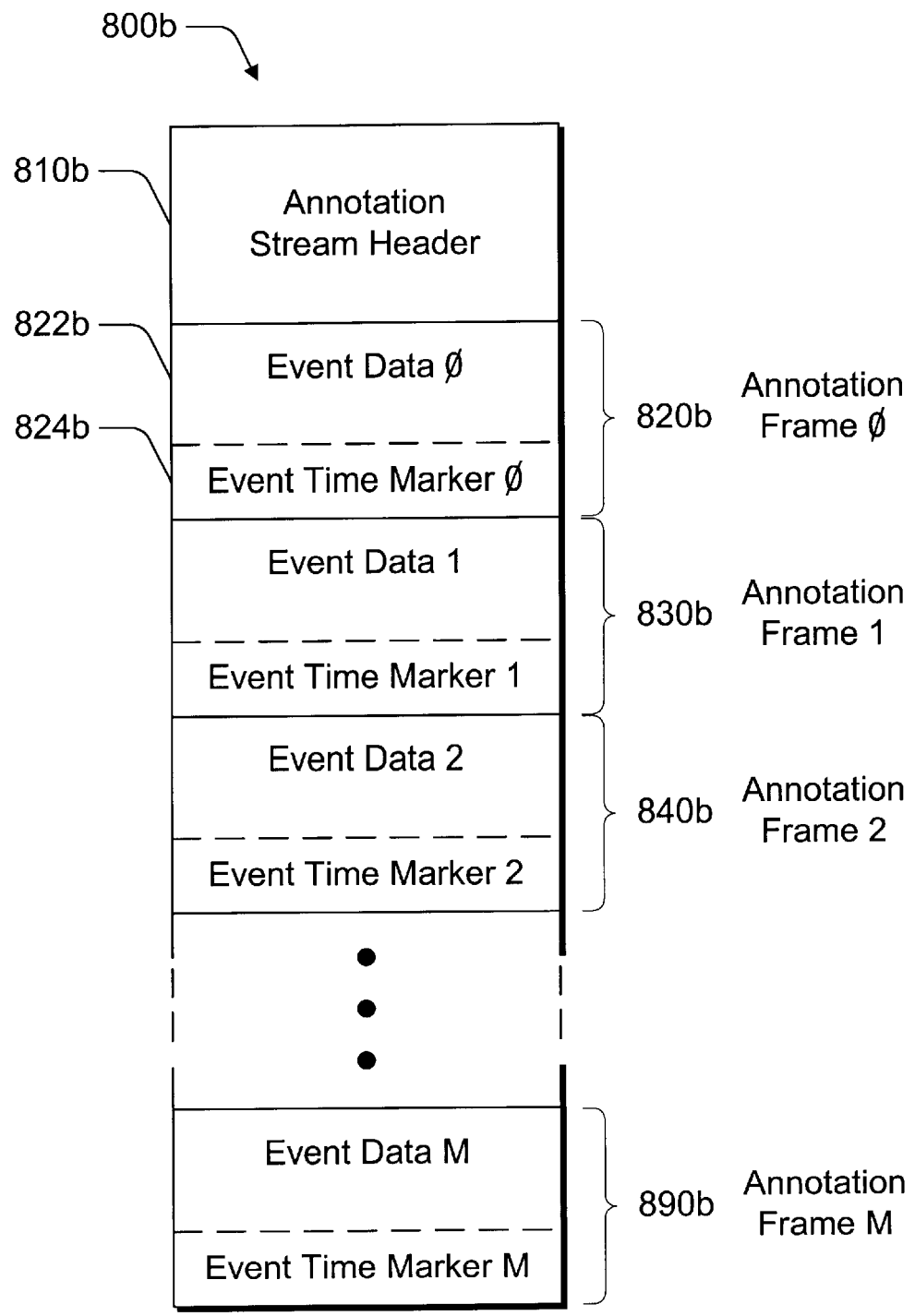

FIGS. 4C and 8B are a flowchart and an exemplary format, respectively, illustrating a data annotation stream 800b. Locator annotation stream 800b includes an annotation stream header 810b, and a plurality of annotation frames 820b, 830b, 840b, . . . 890b. Each annotation frame includes an event locator and an event time marker, e.g., annotation frame 820b includes event locator 822b and event time marker 824b. One example of a data annotation stream is a ticker stream. The generation of the ticker stream is somewhat similar to that of the flipper stream. However, in the case of the ticker stream, instead of event locators, displayable data is embedded directly into the ticker stream as event data.

When author module 318a has completed building an annotation stream, e.g., the flipper stream, the annotation stream is given a file name and loaded into a convenient server, e.g., stream server 220, for subsequent retrieval by client computer 240. The use of the annotation streams is described in greater detail below with the description of client computer 240.

In accordance with another aspect of the invention, LiveScreen display 600 also includes a table of contents (TOC) 630, enabling viewer 249 at client computer 240 to skip forward or backward to a point within the entire video/audio stream 500. TOC 630 include one or more content labels, each indexed to a corresponding time stamp in video stream 500, as defined by TOC time markers 791, 792, 793, 794 in LiveScreen display 600.

Figure 9A:
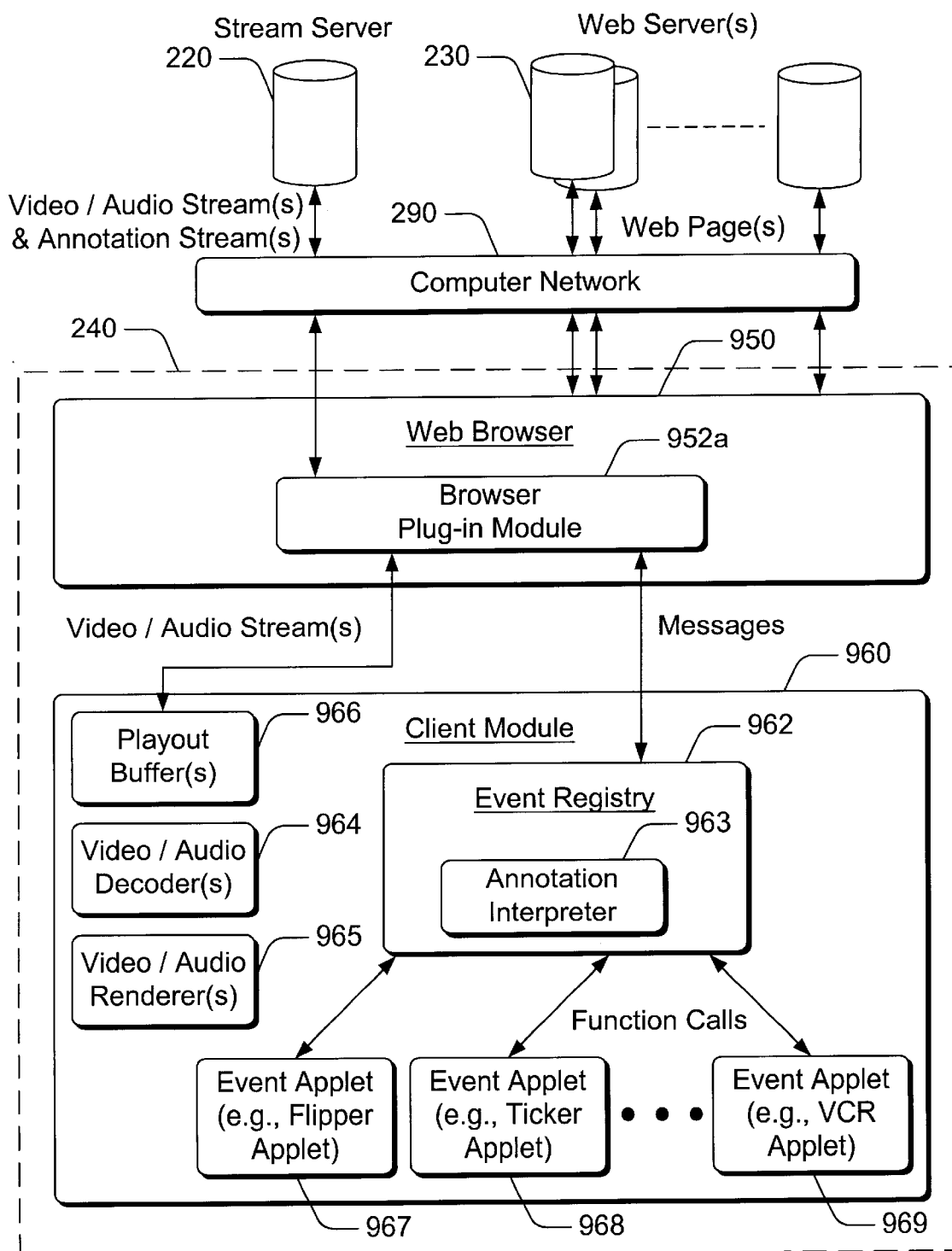
FIG. 9A illustrates one embodiment of the client computer which includes a web browser and a browser plug-in module for interfacing a web browser with a client module.

Referring now to FIG. 9A, in one embodiment of the present invention, client computer 240 includes a web browser 950 and a browser plug-in module 952a for interfacing web browser 950 with a main client module 960. Client module 960 includes an event registry 962, playout buffer(s) 966, video/audio decoder(s) 964, video/audio renderer(s) 965 and one or more dynamically loadable event applet(s), e.g., flipper applet 967, ticker applet 968 and VCR applet 969. In this embodiment, event registry 962 also functions as an annotation interpreter 963.

Figure 10A:
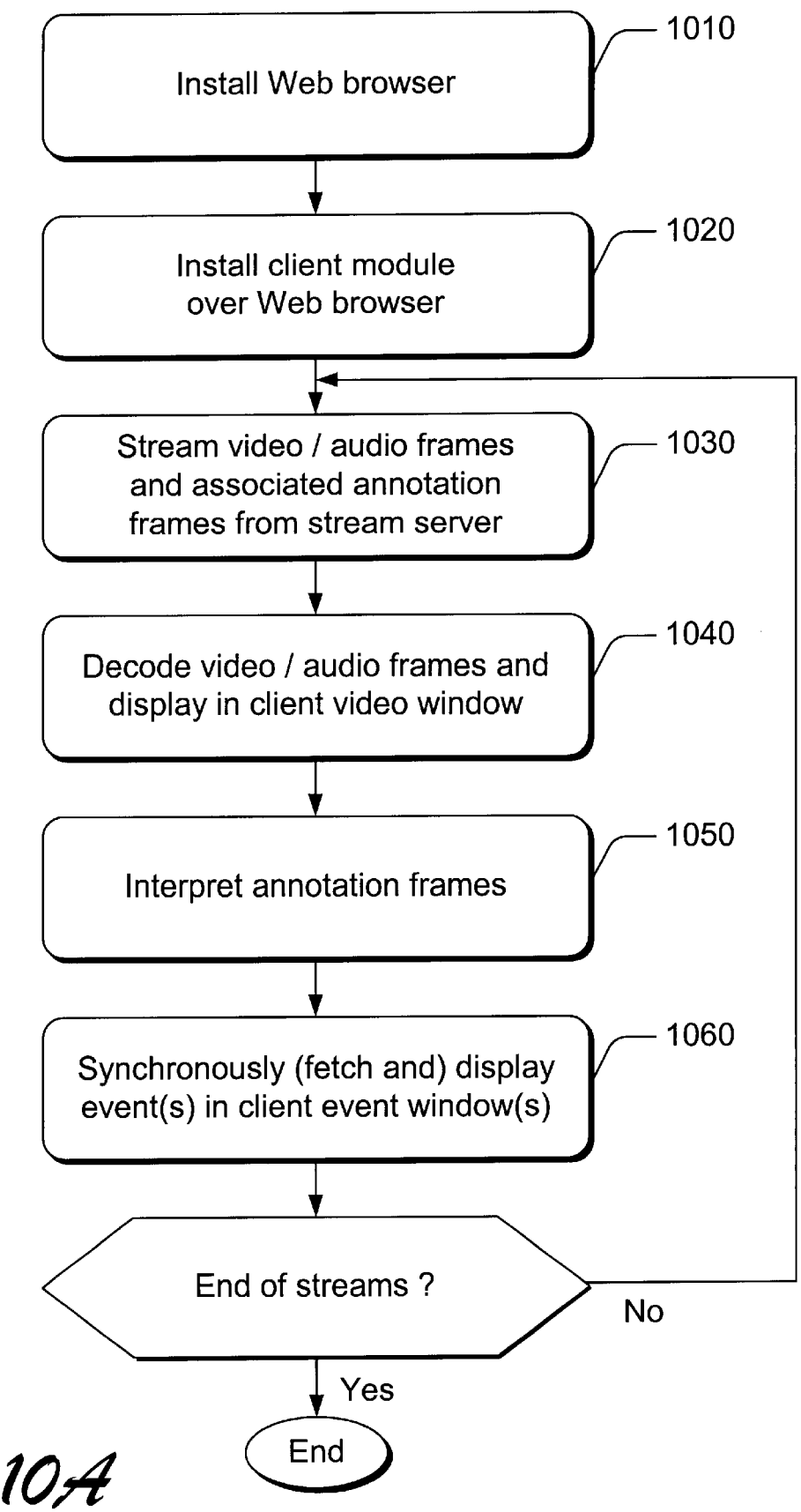
FIGS. 10A and 10B are flowcharts illustrating the operation of the client module.

FIG. 10A is a flowchart illustrating the operation of client module 960. Assume that viewer has not previously loaded client module 960 in client computer 240, but has already loaded a web browser 950, e.g., Netscape's Navigator (step 1010). Viewer surfs the world-wide web (www) via the internet and locates a web site of interest. Typically, the web site of interest is hosted on web server 230. Accordingly, a target web page is downloaded from web server 230 and displayed on client computer 240.

The target web page includes a link to a customized LiveScreen display, e.g., display 600. If client module 960 has not been previously loaded, client module 960 is now loaded over web browser 950 for processing video/audio and annotation streams (step 1020). Depending on the implementation, a copy of client module 960 may be available from the web site of interest. Alternatively, the target web page may provide a HTML link to another web server which has an updated copy of client module 960.

Figure 10B:
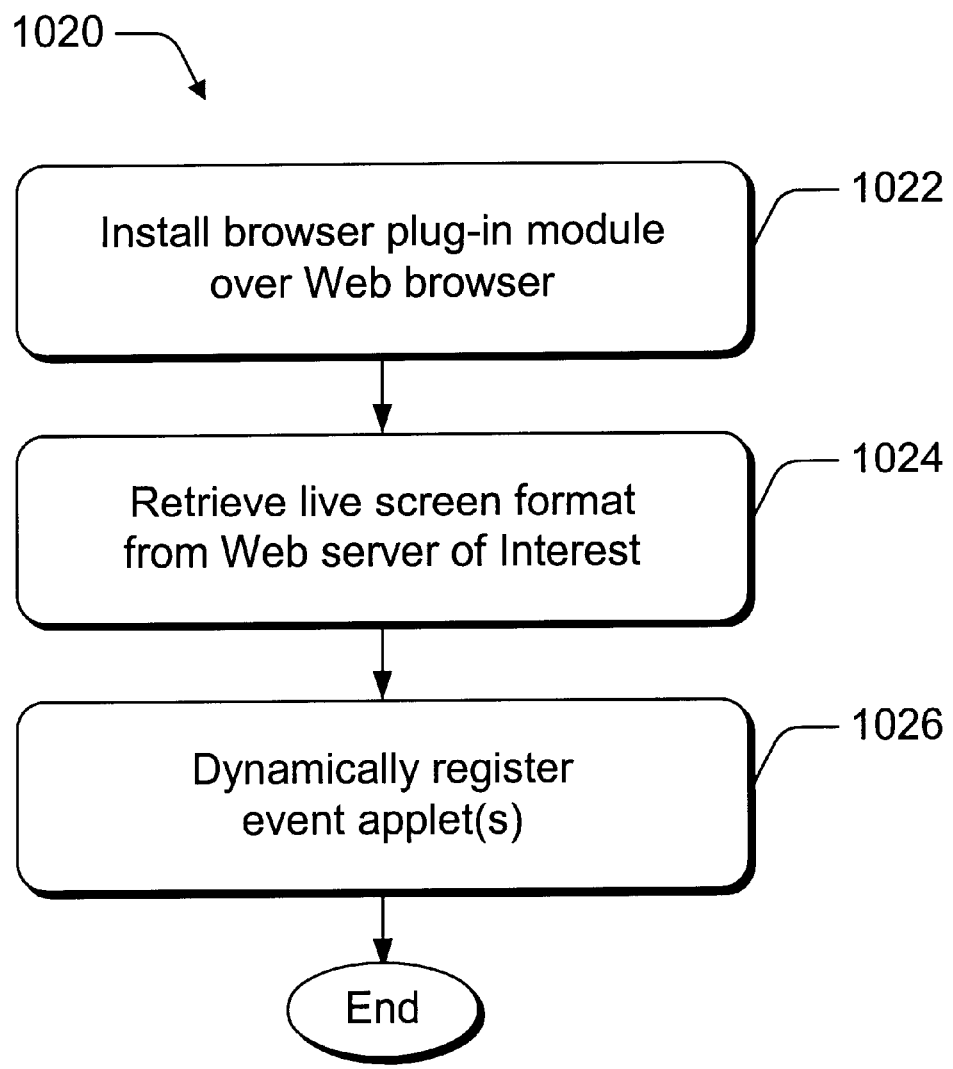

Referring now to FIG. 10B, first, browser plug-in module 952a is installed over web browser 950 (step 1022). As discussed above, plug-in module 952a provides the interface between client module 960 and web browser 950. The target web page provides a HTML link to the format for LiveScreen display 600. The LiveScreen display format is retrieved and display 600 is installed on client computer 240 using web browser 950 (step 1024).

Next, event registry 962 begins a registration/load process of the event applets, e.g., flipper applet 967, ticker applet 968 and VCR applet 969 (step 1026). Event registry 962 is capable of dynamically registering event applets, i.e., registry 962 is capable of registering additional event applets after the initial registration process, thereby making it possible to add new event windows to LiveScreen display 600 of client computer 240 without having to re-install client module 960. Each event applet has a tag which includes attributes such as Java class, command stream format RTP:// server name and file name (location of stream). During the registration process, each applet provides event registry 962 with a list of its respective function(s).

Referring back to FIG. 10A, encoded video/audio frames and associated annotation frames are streamed from stream server 220 to client computer 240 for synchronous display (step 1030). Streaming video and audio streams over a network is very efficient because streaming eliminates the need for a large buffer at client computer 240. In addition, streaming also provides flexibility, e.g., switching video sources midstream is possible without wasting network resources since streaming is based on a pseudo just-in-time (JIT) protocol and does not involve downloads of the entire video stream prior to display at client computer 240. If the underlying transmission protocol is HTTP, then video, audio and annotation packets are initially "pulled" by client computer 240 from server 220 using HTTP "get" packet(s).

Next, the encoded video/audio streams are decoded by decoder 964, i.e., decompressed using a suitable technique, and then displayed at client computer 240 by renderer 965 (step 1040).

In this implementation, annotation frames streamed from stream server 220 are encoded in Visual Basic script. As shown in FIGS. 8A and 8B, annotation streams 800a, 800b include stream headers 810a, 810b, respectively, followed by one or more annotation frames. Annotation interpreter 963 parses annotation frames in real-time in the form of messages from stream server 220, and converts the messages into a C++ function calls for the respective event applets (step 1050). In the case of flipper stream 800a, each annotation frame includes a HTML address and an event time marker. In the case of ticker stream 800b, each annotation frame includes ticker data and an event time marker. Note that an event time marker need not be identical to a corresponding video time stamp. Client computer 240 is capable of switching to a new displayable event together with a video frame or in between two video frames.

While the contents of annotation frames may differ, from the perspective of stream streamer 220, the event data or event locator are simply arguments to be passed on to client computer 240 to be processed by client computer 240. Hence, all annotation frames are processed in the same manner by stream server 220, i.e., annotation frames are streamed to client computer 240 at the appropriate time in accordance with their respective event time markers.

Further, since the video and annotation streams are handled synchronously but separately by video decoder 964 and annotation interpreter 963, respectively, steps 1040 and 1050 can occur concurrently or consecutively. As discussed above, event registry 962 is capable of dynamic registration of event applets. Accordingly, annotation interpreter 963 is adaptable, and capable of automatic installation and linking of new event applet(s) to add new class(es) of displayable events for client computer 240.

After registering with event registry 962, flipper applet 967 provides the location of the flipper stream to broswer 950 which then begin receiving the flipper stream from stream server 220. Flipper annotation frames are provided by stream server 220 synchronously with the video/audio frames to client module 960 so that the annotations, i.e., displayable events can be synchronized for display at client computer 240 (step 1060). In this example, URL addresses, for synchronizing HTML page flips with video stream are provided to web browser 950 thereby permitting client computer 240 to subsequently retrieve and display various textual and graphical elements changing at predetermined points corresponding to the timeline of the video stream. Note that HTML pages can be retrieved from one or more web server(s) 230.

Similarly, after registering with event registry 962, ticker (tape) applet 968 provides the location of the ticker stream to broswer 950 which then begins receiving the ticker stream from stream server 220. Ticker annotation frames are provided by stream server 220 synchronously with the video/audio frames so that the annotations, i.e., displayable ticker data can be synchronized for display at client computer 240 at predetermined points corresponding to the timeline of the video stream.

Many types and combinations of display windows and/or content are possible. For example, another window may be used to display documents delivered via a data annotation stream and a "PowerPoint" viewer. Another exemplary variation includes providing an annotation stream to an "ActiveX" object for viewing displayable event(s) associated with a HTML page.

After registration, VCR control applet 969 provides VCR-like control buttons 620 such as play, rewind, fast forward, pause, and live-play. Note that since VCR buttons are interactively controlled by a viewer 249, activation points in the time line cannot be predicted in advance, and so no annotation stream is used. Instead, when a VCR-type function such as rewind ("REW") is activated, VCR applet 969 sends an appropriate message is sent to stream server 220, which resets both the video/audio streams and annotation stream(s) to the viewer selected point in time.

Figure 11:
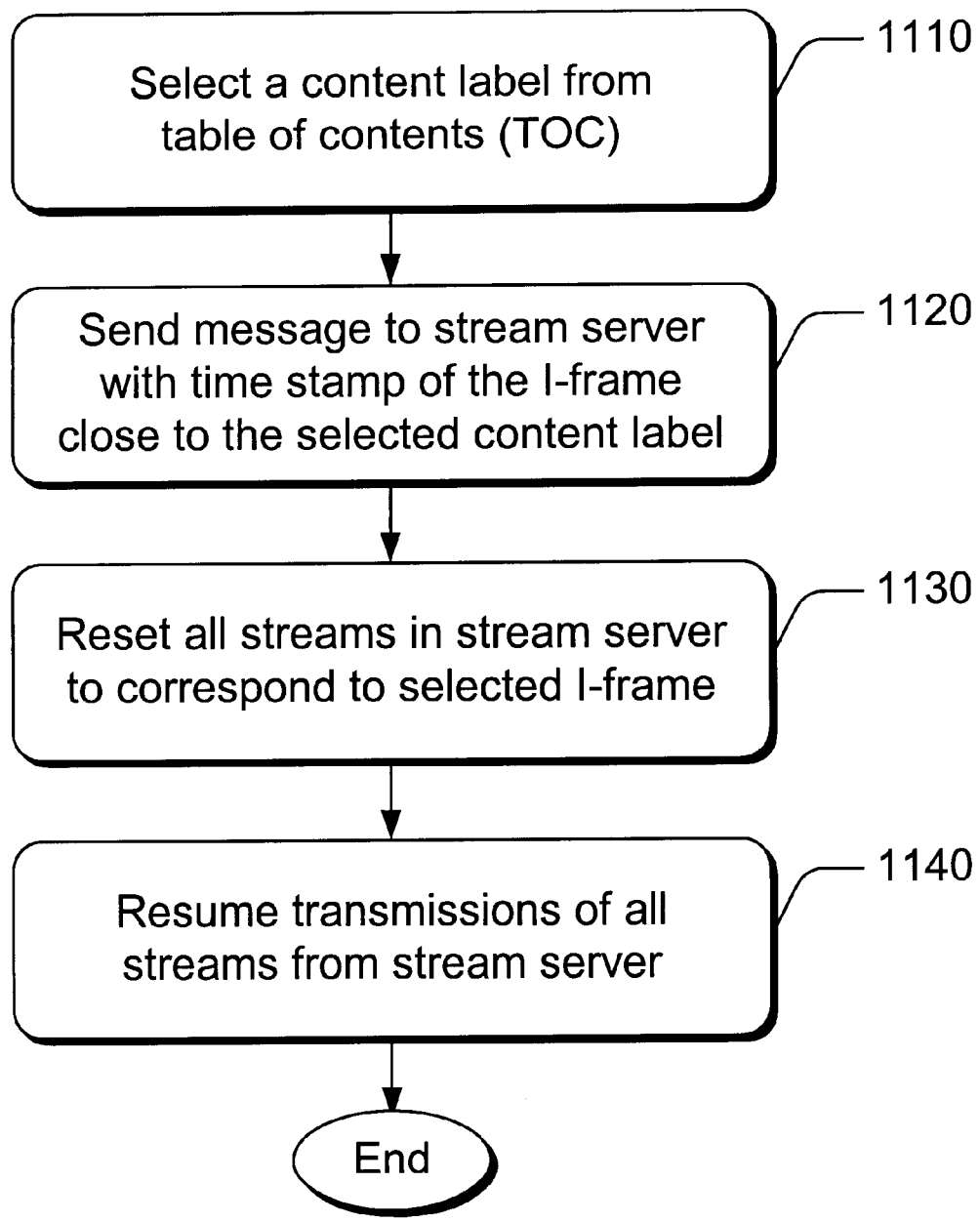
FIG. 11 is a flowchart illustrating the use of a table of content with content labels enabling a viewer to skip forward or backward to predetermined locations in the video/audio stream.

As shown in FIG. 11, a table of content 630 with content labels enables a viewer to skip forward or backward to predetermined locations in the video/audio stream. First, viewer selects a content label of interest (step 1110). Examples of suitable content labels are section headings of the video stream. Next, client module 960 sends a message to stream server 220 with the time stamp of an I-frame from the video stream whose location is close to selected content label (step 1120). In this embodiment, an I-frame is a video frame which includes data for a complete video frame. Although computationally more intensive, it is also possible to select a P-frame and then reconstructed a complete video starting from a neighboring I-frame close to the selected P-frame.

In step 1130, stream server 220 resets the video/audio stream and the annotation stream(s) to correspond to the selected I-frame. Stream server 220 is now ready to resume transmission of the video/audio stream and the annotation stream(s) to client computer 240 for viewing (step 1140).

Figure 3B:
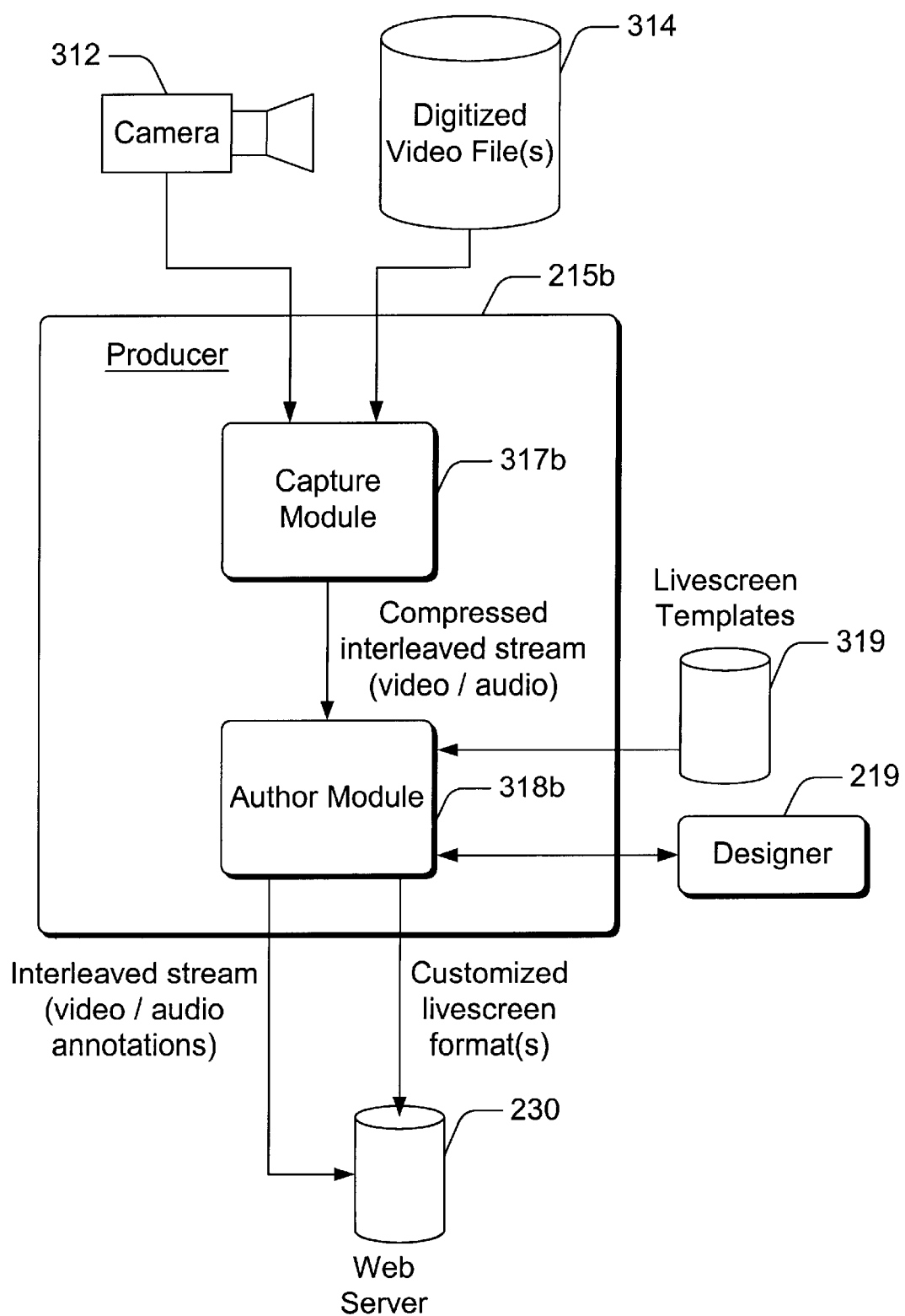
FIG. 3B shows another embodiment of the producer in which the capture module generates an interleaved stream.
Figure 9B:
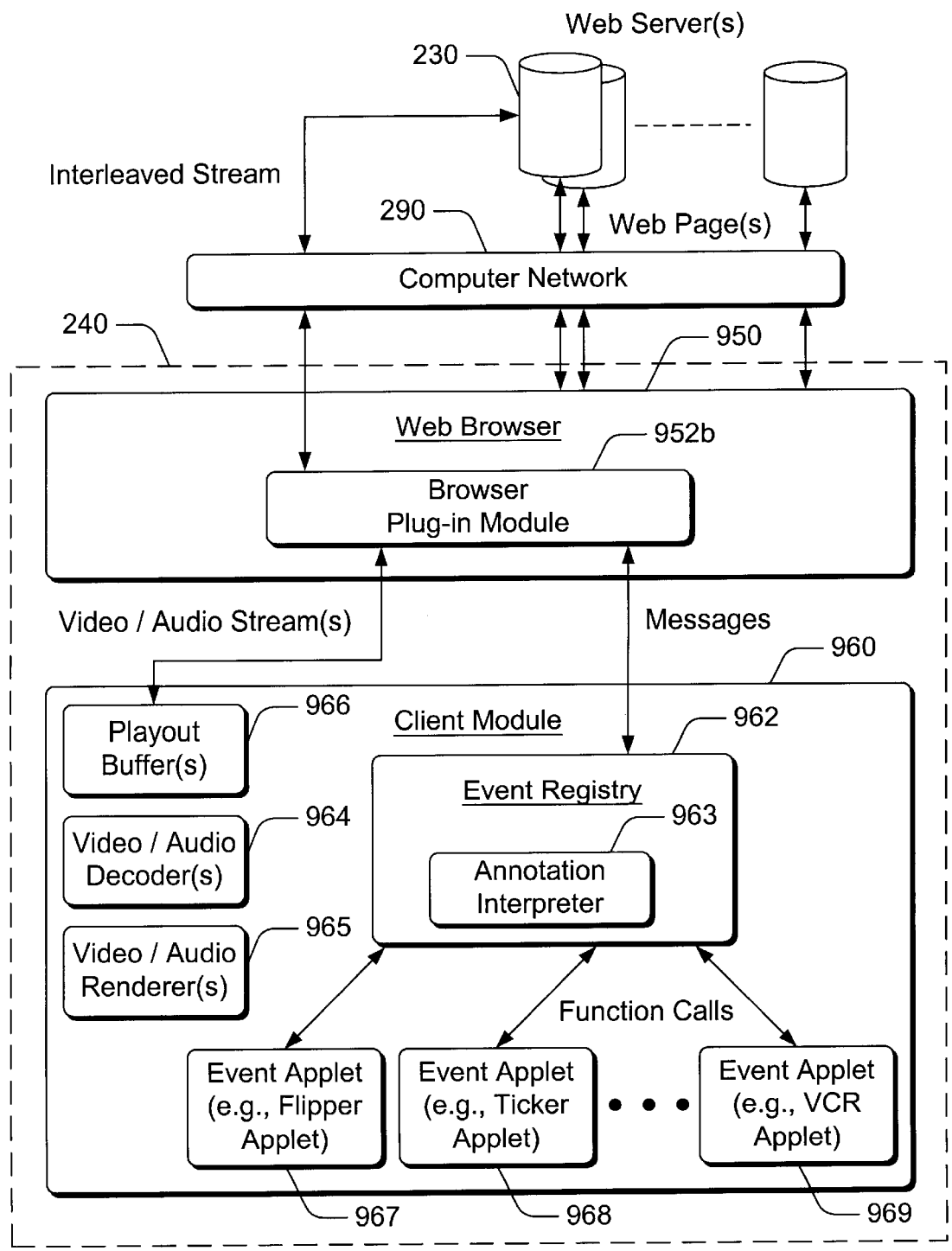
FIG. 9B illustrates another embodiment of the client computer in which the browser plug-in module receives an interleaved stream from the web server and distributes the video/audio stream(s) to the video/audio decoder(s) and the annotation stream(s) to the annotation interpreter.

Referring now to FIGS. 3B and 9B, in another embodiment, instead of streaming three separate video, audio and annotation streams from stream server 220 to client computer 240, an interleaved video/audio/annotation file is produced by producer 215b, stored in web server 230, and subsequently provided to client module 960 on demand via web browser 950. Note that an interleaved file can include any two or more frame types, e.g., video and audio frames, video and annotation frames, or audio and annotation frames.

Advantages of this embodiment include simplified synchronous delivery of video, audio and annotation frames to client computer 240. Simplicity is accomplished by eliminating the need for stream server 220, whose primary function is to manage the transmission of several separate video, audio and annotation streams from stream server 220 to client computer 240. In this embodiment, since all the video, audio and annotation frames are combined into a single interleaved stream and are pre-sorted by timestamp values, the interleaved stream can now be stored in web server 230 and delivered in the form of HTTP data.

Figure 12A:
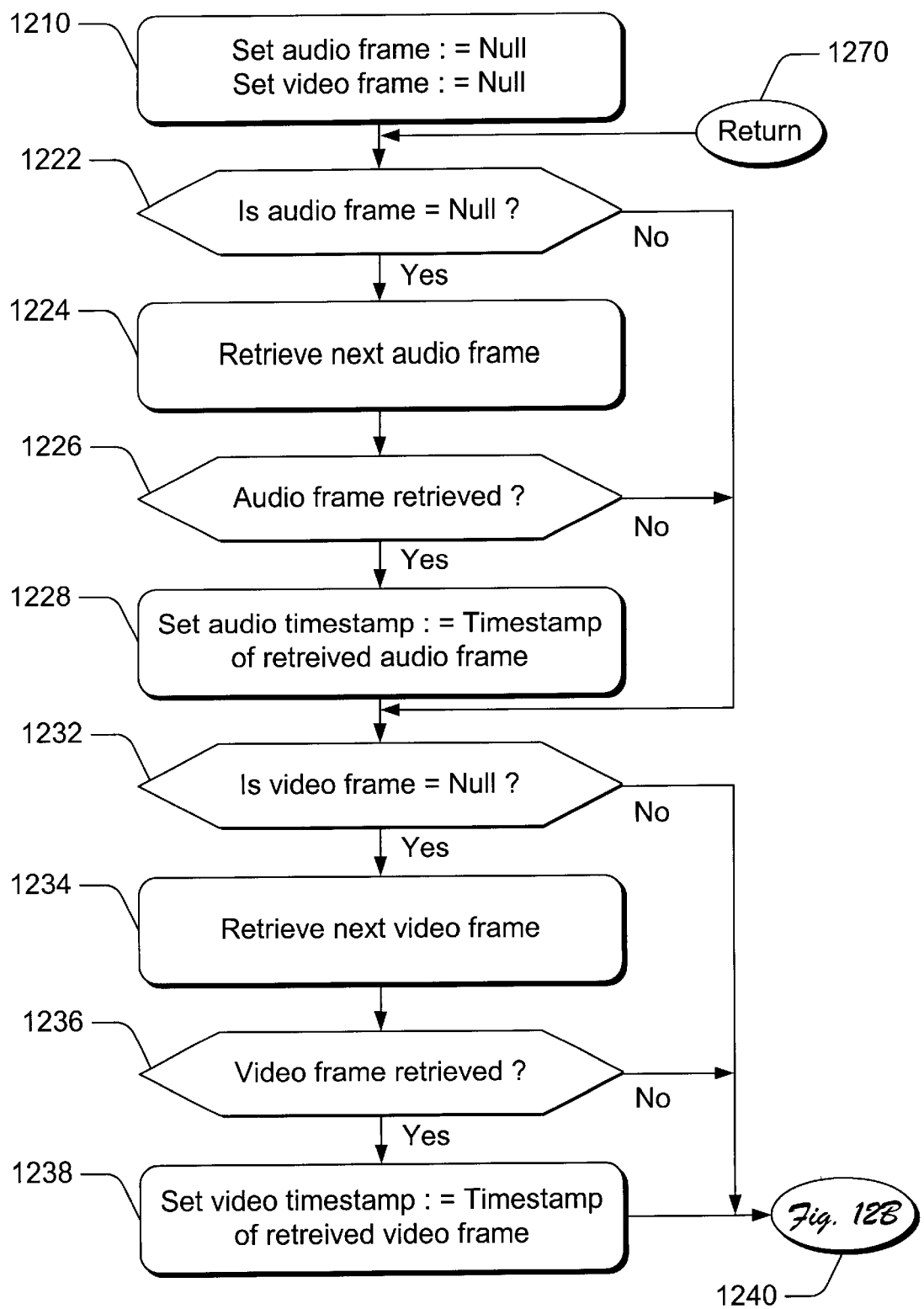
FIGS. 12A and 12B are two portions of a flowchart illustrating the combination of video frames from a video file and audio frames from an audio file into an interleaved file.
Figure 12B:
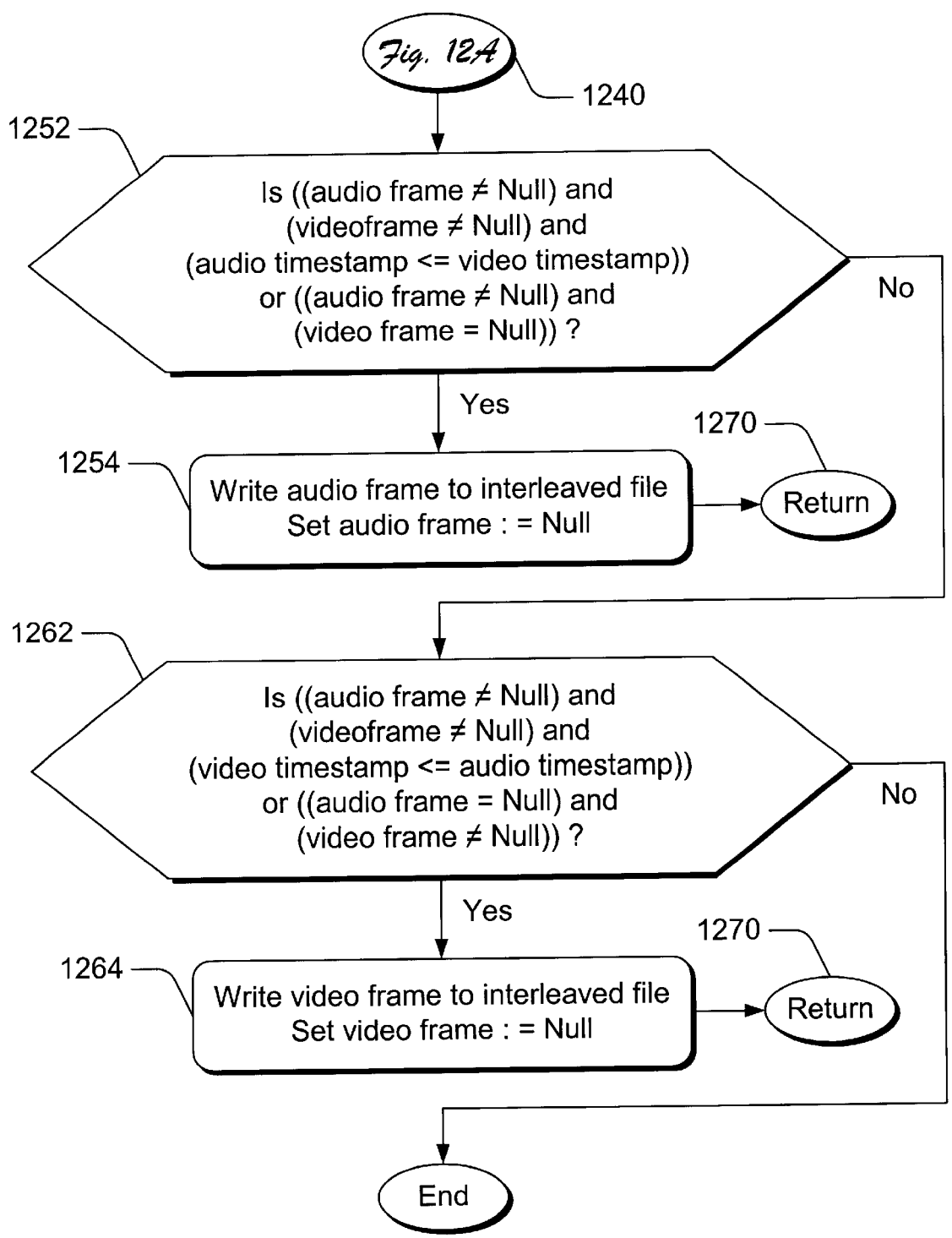

FIGS. 12A and 12B are two portions of a flowchart illustrating the combination of video frames from a video file and audio frames from an audio file into an interleaved file by producer 215b. First, the audioframe and videoframe buffers are initialized to "null" (step 1210). Note that null can be represented by any one of a variety of ways known to one skilled in the art.

In step 1222, if the audioframe buffer is empty, i.e., set to null, then producer 215b retrieves the next audio frame from the audio file (step 1224). If the retrieval is successful (step 1226), then the audiotimestamp is set to the timestamp of the retrieved audio frame (step 1228).

In step 1232, if the videoframe buffer is empty, i.e., set to null, then producer 215b retrieves the next video frame from the video file (step 1234). If the retrieval is successful (step 1236), then the videotimestamp is set to the timestamp of the retrieved video frame (step 1238).

If both the audioframe and videoframe buffers are full and the audiotimestamp is less than or equal to the videotimestamp, OR if the audiotimestamp is full and the videotimestamp is empty (step 1252), then producer 215b writes the audio frame in the audioframe buffer to the interleaved file, sets the audioframe buffer to null, and returns (1270) to step 1222 (step 1254).

If both the audioframe and videoframe buffers are full and the videotimestamp is less than or equal to the audiotimestamp, OR if the videotimestamp is full and the audiotimestamp is empty (step 1262), then producer 215b writes the video frame in the videoframe buffer to the interleaved file, sets the videoframe buffer to null, and returns (1270) to step 1222 (step 1264).

Eventually, both audioframe and videoframe buffers will be empty again and results of steps 1252 and 1262 will both be negative, indicating that all the frames in both video and audio files are been processed, and the interleaved video and audio file is now complete. The above described algorithm for generating an interleaved file from two input files can be adapted to generating an interleaved file from three or more input files, e.g., by adding the appropriate number of buffers, one for each additional input file.

Figures 13A, 13B:
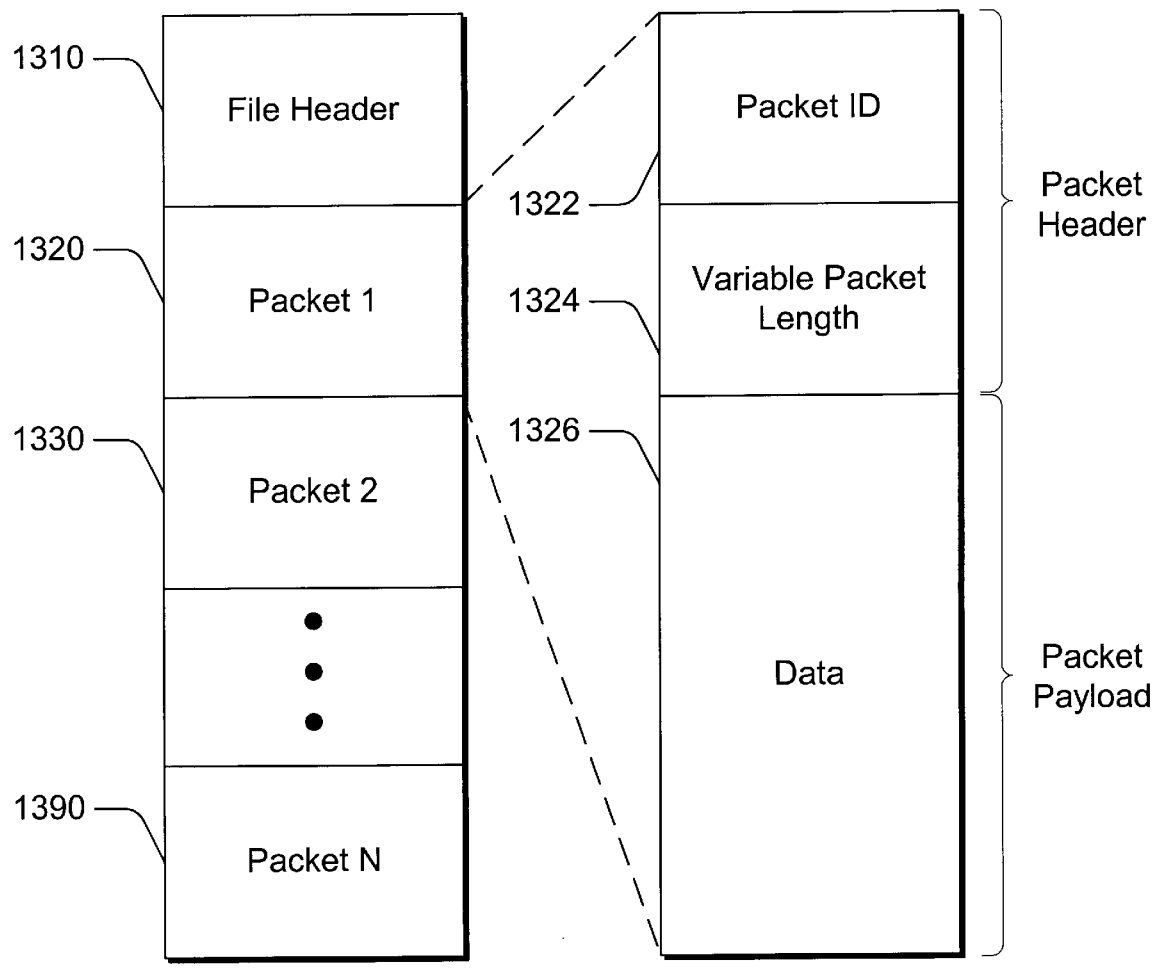
FIGS. 13A and 13B illustrate an exemplary format of the interleaved file which includes a plurality of data packets for storing video and audio frames with a variable packet length field.
Figures 14A, 14B, 14C:
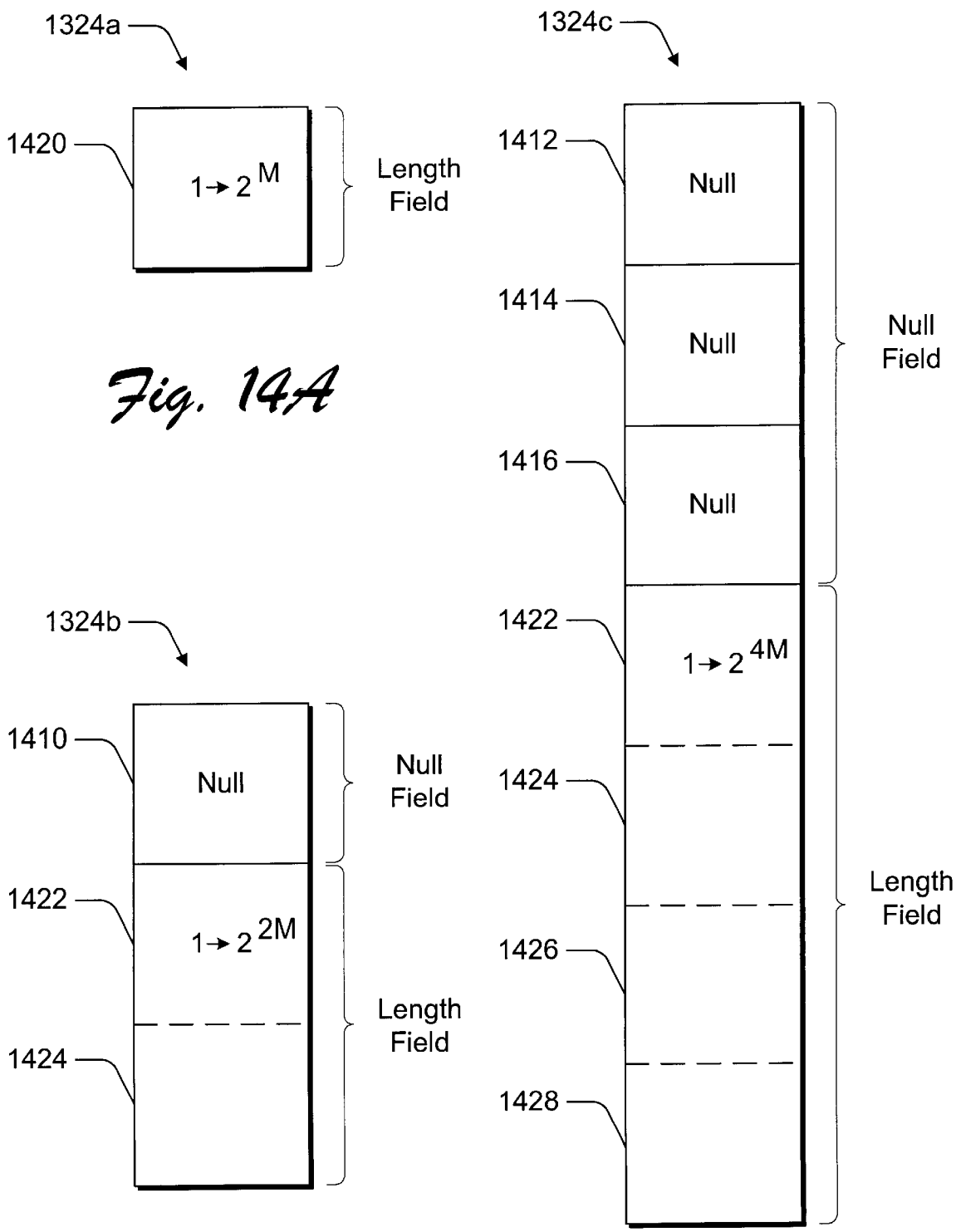
FIGS. 14A, 14B, and 14C show three exemplary formats for the variable packet length field of FIG. 13B.

In accordance with another aspect of this embodiment, the data packets 1320, 1330, . . . 1390 for streaming video and audio frames include a variable packet length field 1324 as shown in FIGS. 13A and 13B. Referring to FIGS. 14A, 14B, and 14C, three exemplary formats 1324a, 1324b, and 1324c of the variable packet length field 1324 are shown. In this implementation, the length of the variable packet length field is in multiples of number units. For example, formats 1324a, 1324b and 1324c can be one numerical unit in length, three numerical units in length and seven numerical units in length, respectively. As is known to one skilled in the art, regardless of the size of the packet length field, the packet length can be represented by a number of different methods, such as simple binary, one's complement, BCD and floating point.

Figure 15:
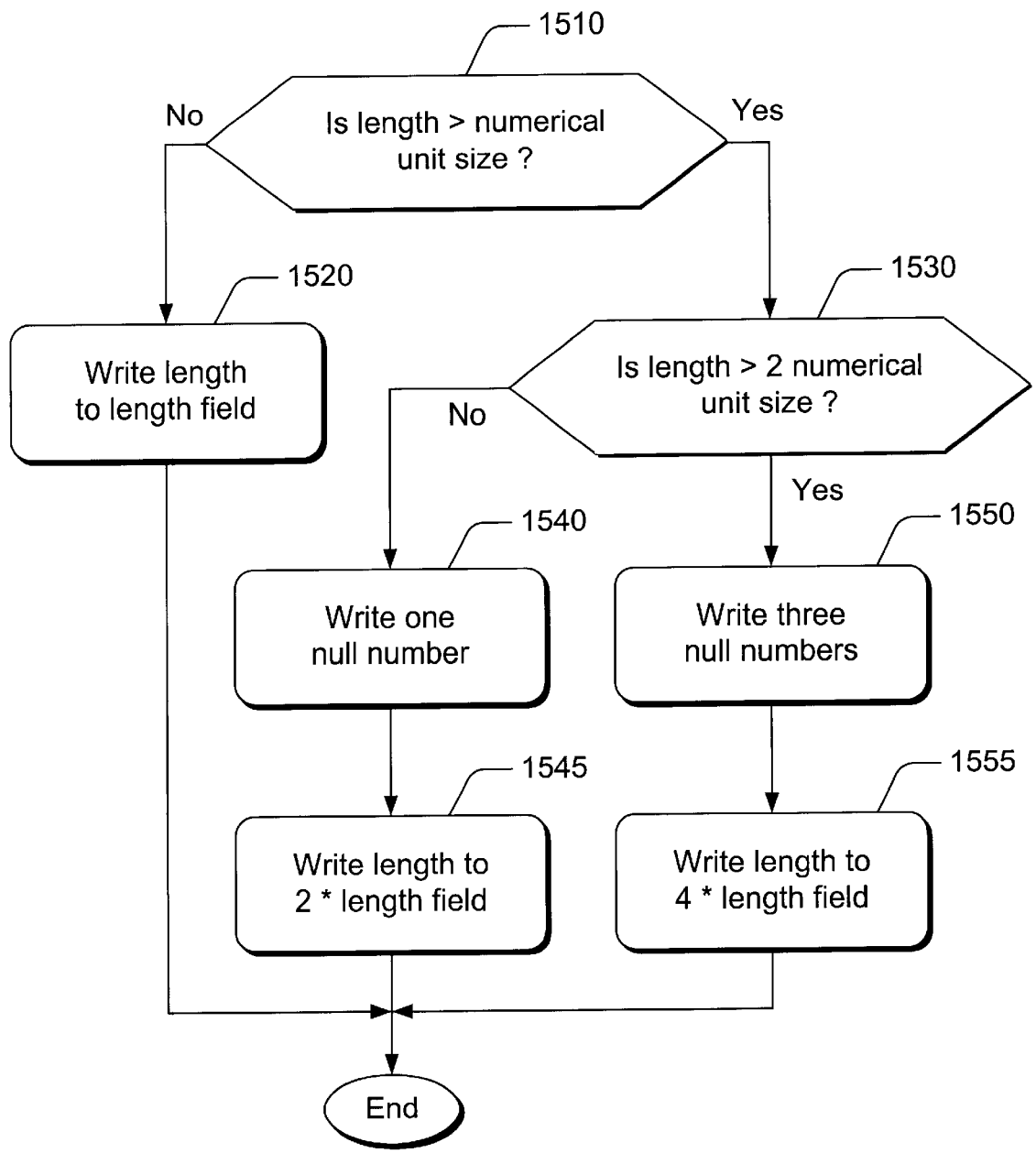
FIG. 15 is a flowchart illustrating the selection of a suitable format for writing a packet into the interleaved file.

FIG. 15 is a flowchart illustrating the selection of a suitable format for writing a packet into the interleaved file. If the size of packet length 1324 is less than one numerical unit (step 1510), then the first format 1324a (FIG. 14A) with one numerical unit length is sufficient to store packet length 1324 (step 1520).

Else if the size of packet length 1324 between one numerical unit (step 1510) and two numerical units (step 1530), then a null number, one numerical unit in size, is written (step 1540). As discussed above, null can be represented in any one of a number of ways known to one skilled in the art. Next, producer 215b writes packet length 1324 up to two numerical units in size as shown in FIG. 14B (step 1545).

Else if the size of packet length 1324 is greater than two numerical units (step 1530), then three null numbers, each one numerical unit in size, are written (step 1550). Next, producer 215b writes packet length 1324 up to four numerical units in size as shown in FIG. 14C (step 1555).

Figure 16:
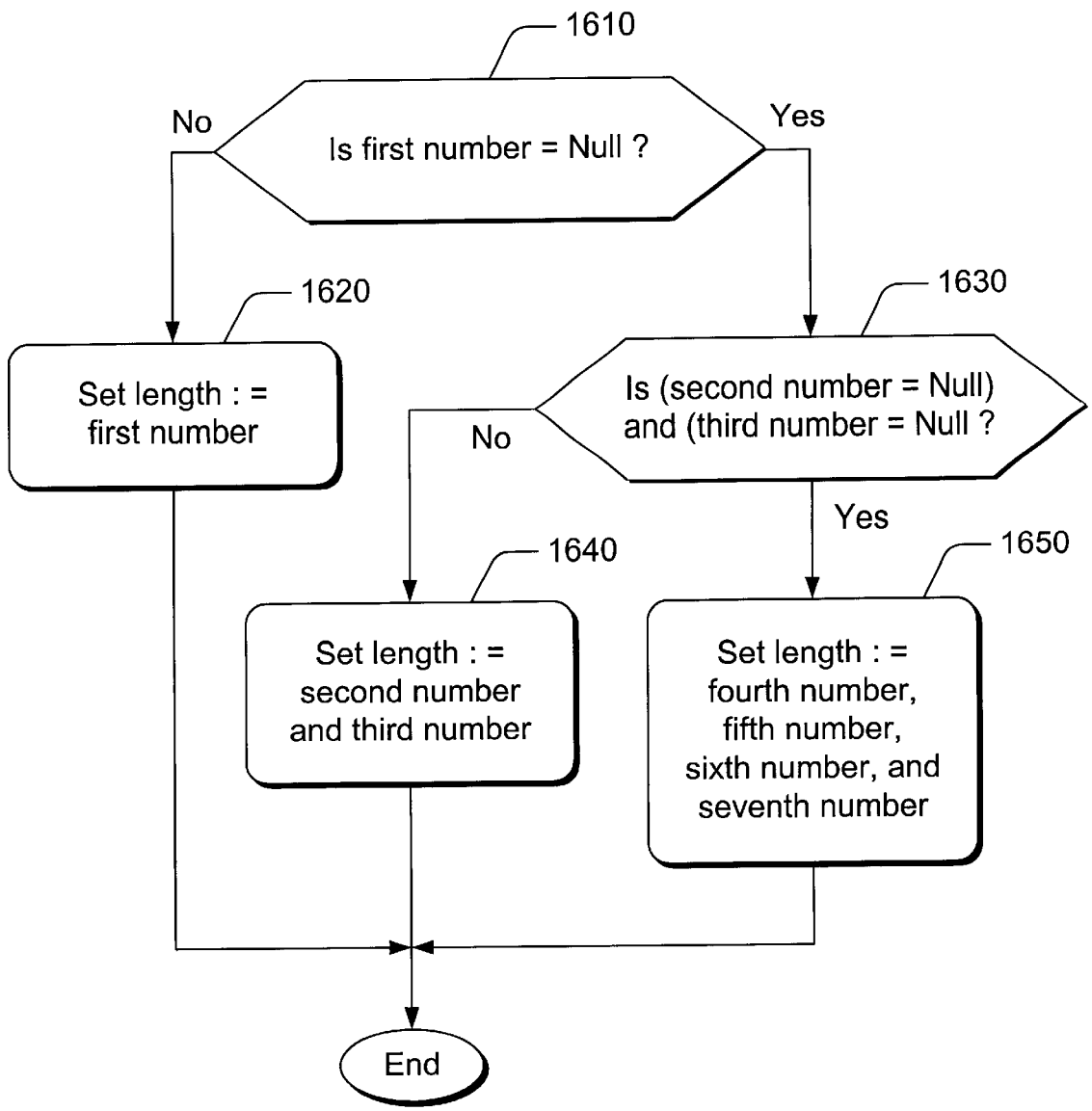
FIG. 16 is a flowchart illustrating the interpretation of the exemplary variable packet length field formats of FIGS. 14A, 14B and 14C, respectively.

FIG. 16 is a flowchart illustrating the interpretation of the variable packet length field formats 1324a, 1324b, and 1324c of FIGS. 14A, 14B and 14C, respectively. If the first number (one numeral unit in size) is not null (step 1610), then the first number is the value of variable packet length 1324 (step 1620).

Else if the first number is null, but the second number and the third number are not both null (steps 1610 and 1630), then the second number and the third number represent the value of variable packet length 1324 (step 1640).

Else if the first, second and third numbers are all null (steps 1610 and 1630), then the fourth, fifth, sixth and seventh numbers represent the value of variable packet length 1324 (step 1640).

Many variations of this embodiment are also possible. For example, capture module 317b may generate separate compressed video files and audio files and leave the entire interleaving step to author module 318b which receives the separate video and audio frames, generates the annotation frames, and then combines the video, audio and annotation frames into an interleaved file. Modifications are also possible in client module 960. For example, instead of tasking browser plug-in module 952b with the separation of the interleaved stream into its component video and audio frames and annotation messages, browser plug-in module 952b may pass on the interleaved stream to client module 960 which then separates the interleaved stream into its component frames.

While this invention has been described in terms of several preferred embodiments, there are alterations, permutations, and equivalents which fall within the scope of this invention. For example, although the present invention is described using video, audio and annotation frames, the methods and apparatuses of the present invention are equally applicable other multimedia frames. It is therefore intended that the following appended claims be interpreted as including all such alterations, permutations, and equivalents as fall within the true spirit and scope of the present invention.

What is claimed is:

1. In a computer having a processor and memory, said computer useful in association with a web server coupled to a client computer via a network, a method for producing an interleaved multimedia file from a video file and an audio file, the method comprising:

retrieving a first video frame from the video file, said first video frame including a video timestamp, in response to determining a video frame buffer is empty;

retrieving a first audio frame from the audio file, said first audio frame including a audio timestamp, in response to determining an audio frame buffer is empty;

writing the first video frame to a first packet of the interleaved file in response to determining that the video timestamp is less than or equal to the audio timestamp, retrieving a second video frame from the video file in response to determining that the video timestamp is less than or equal to the audio timestamp, writing the first audio frame to a second packet of the interleaved file in response to determining that the audio timestamp is less than or equal to the video timestamp, and retrieving a second audio frame from the audio file in response to determining that the audio timestamp is less than or equal to the video timestamp;

writing a size of a variable packet length field of the first packet of the interleaved multimedia file to a length field of the variable packet length field of the first packet of the interleaved multimedia file; and writing at least one null number into a null field of the variable packet length field of the first packet of the interleaved multimedia file, a number of null numbers written into the null field being selected as a function of a size of the first video frame.

2. The method of claim 1, wherein said first and second packet each have a variable packet length field having a size.

3. In a computer having a processor and memory, said computer useful in association with a web server coupled to a client computer via a network, a method for producing an interleaved multimedia file from a video file and an audio file, the method comprising:

retrieving a first video frame from the video file, said first video frame including a video timestamp, upon determining that a video frame buffer is empty;

retrieving a first audio frame from the audio file, said first audio frame including an audio timestamp, upon determining that an audio frame buffer is empty; and writing the first video frame to a first packet of the interleaved file upon determining that the video timestamp is less than or equal to the audio timestamp, retrieving a second video frame from the video file upon determining that the video timestamp is less than or equal to the audio timestamp, writing the first audio frame to a second packet of the interleaved file upon determining that the audio timestamp is less than or equal to the video timestamp, and retrieving a second audio frame from the audio file upon determining that the audio timestamp is less than or equal to the video timestamp, wherein said first and second packet each have a variable packet length field having a size, wherein the size of the variable packet length field is at least one numerical unit, and writing the first video frame to the first packet includes writing the size into a length of the variable packet length field of the first packet, writing a null number into a null field of the variable packet length field of the first packet upon determining the size of the first video frame is between one numerical unit and two numerical units, and writing three null numbers into the null field of the variable packet length field of the first packet upon determining the size of the first video frame is greater than two numerical units.

4. The method of claim 1 further comprising writing an annotation frame from an annotation file into said interleaved file.

5. A producer useful for generating an interleaved file configured to provide a synchronized playback of a video file and an audio file on a client computer, the producer comprising:

a capture module configured to generate an interleaved file from video frames from the video file and audio frames from the audio file, based on timestamps of the video frames and the audio frames, the video frames and audio frames both having packets having variable packet length fields, the capture module configured to write a size of a variable packet length field to a length field of a variable packet length field of a packet of the interleaved multimedia file and to write at least one null number into a null field of the variable packet length field of the first packet of the interleaved multimedia file, a number of null numbers written into the null field being selected as a function of a size of a video frame; and an author module configured to combine said interleaved file with a plurality of annotation frames, based on the timestamps of the video frames, the audio frames and the annotation frames.

6. The producer of claim 5 wherein said video and audio frames are stored in packets with variable packet length fields.

7. A computer-readable medium useful in association with a computer system having a processor and memory, the computer-readable medium comprising computer-readable code instructions configured to cause said computer system to execute a method comprising:

retrieving a first video frame from a video file, said first video frame including a video timestamp in response to determining that a video frame buffer is empty;

retrieving a first audio frame from an audio file, said first audio frame including an audio timestamp in response to determining that an audio frame buffer is empty;

writing the first video frame to a first packet of the interleaved file in response to determining that the video timestamp is less than or equal to the audio timestamp;

retrieving a second video frame from the video file upon determining that the video timestamp is less than or equal to the audio timestamp;

writing the first audio frame to a second packet of the interleaved file in response to determining that the audio timestamp is less than or equal to the video timestamp;

retrieving a second audio frame from the audio file upon determining that the audio timestamp is less than or equal to the video timestamp;

writing a size of a variable packet length field of the first packet of the interleaved multimedia file to a length field of the variable packet length field of the first packet of the interleaved multimedia file; and writing at least one null number into a null field of the variable packet length field of the first packet of the interleaved multimedia file, a number of null numbers written into the null field being selected as a function of a size of the first video frame.

8. The computer-readable medium of claim 7, wherein said first and second packet each have a variable packet length field having a size.

9. A computer-readable medium useful in association with a computer system having a processor and memory, the computer-readable medium comprising computer-readable code instructions configured to cause said computer system to execute a method comprising:

retrieving a first video frame from a video file, said first frame including a video timestamp upon determining that a video frame buffer is empty;

retrieving a first audio frame from an audio file, said first audio frame including an audio timestamp upon determining that an audio frame buffer is empty;

writing the first video frame to a first packet of an interleaved file upon determining that the video timestamp is less than or equal to the audio timestamp;

retrieving a second video frame from the video file upon determining that the video timestamp is less than or equal to the audio timestamp;

writing the first audio frame to a second packet of the interleaved file upon determining that the audio timestamp is less than or equal to the video timestamp; and retrieving a second audio frame from the audio file upon determining that the audio timestamp is less than or equal to the video timestamp, wherein said first and second packet each have a variable packet length field having a size, and wherein the size of the variable packet length field is at least one numerical unit, and writing the first video frame to the first packet includes writing the size into a length field of the variable packet length field of the first packet, writing a null number into a null field of the variable packet length field of the first packet upon determining the size of the first video frame is between one numerical unit and two numerical units, writing three null number into a null field of the variable packet length field of the first packet upon determining the size of the first video frame is greater than two numerical units.

10. The computer readable medium of claim 7 further comprising computer-readable code instructions configured to cause said computer system to execute writing an annotation frame from an annotation file into said interleaved file.

11. In a computer having a processor and memory, said computer useful in association with a web server coupled to a client computer via a network, a method for producing an interleaved multimedia file from a video file and an audio file, the method comprising:

retrieving a first video frame from the video file, said first video frame including a video timestamp, upon determining that a video frame buffer is empty;

retrieving a first audio frame from the audio file, said first audio frame including an audio timestamp, upon determining that an audio frame buffer is empty; and writing the first video frame to a first packet of the interleaved file upon determining that the video timestamp is less than or equal to the audio timestamp;

retrieving a second video frame from the video file upon determining that the video timestamp is less than or equal to the audio timestamp;

writing the first audio frame to a second packet of the interleaved file upon determining that the audio timestamp is less than or equal to the video timestamp; and retrieving a second audio frame from the audio file upon determining that the audio timestamp is less than or equal to the video timestamp, wherein said first and second packet each have a variable packet length field having a size, wherein the size of the variable packet length field is at least one numerical unit, and writing the first video frame to the first packet includes writing the size into a length field of the variable packet length field of the first packet, and writing a number into a field of the variable packet length field, wherein the number corresponds to the size of the video frame.

12. A computer-readable medium useful in association with a computer system having a processor and memory, the computer-readable medium comprising computer-readable code instructions configured to cause said computer system to execute a method comprising:

retrieving a first video frame from a video file, said first video frame including a video timestamp upon determining that a video frame buffer is empty;

retrieving a first audio frame from an audio file, said first audio frame including an audio timestamp upon determining that an audio frame buffer is empty;

writing the first video frame to a first packet of the interleaved file upon determining that the video timestamp is less than or equal to the audio timestamp;

retrieving a second video frame from the video file upon determining that the video timestamp is less than or equal to the audio timestamp;

writing the first audio frame to a second packet of the interleaved file upon determining that the audio timestamp is less than or equal to the video timestamp; and retrieving a second audio frame from the audio file upon determining that the audio timestamp is less than or equal to the video timestamp;

wherein said first and second packet each have a variable packet length field having a size, wherein the size of the variable packet length field is at least one numerical unit, and writing the first video frame to the first packet includes writing the size into a length field of the variable packet length field of the first packet, writing a null number into a null field of the variable packet length field of the first packet upon determining the size of the first video frame is between one numerical unit and two numerical units, writing three null numbers into the null field of the variable packet length field of the first packet upon determining the size of the first video frame is greater than two numerical units.

13. In a computer having a processor and a memory, the computer useful in association with a web server coupled to a client computer via a network, a method for producing an interleaved multimedia file from a video file and an audio file, the method comprising:

retrieving a first video frame from the video file in response to determining that a video frame buffer is empty, the first video frame having a video timestamp;

retrieving a first audio frame from the audio file in response to determining that an audio frame buffer is empty, the first audio frame having an audio timestamp;

writing the first video frame to a first packet of the interleaved multimedia file in response to determining that the video timestamp is not greater than the audio timestamp;

retrieving a second video frame from the video file in response to determining that the video timestamp is not greater than the audio timestamp;

writing the first audio frame to a second packet of the interleaved multimedia file in response to determining that the audio timestamp is not greater than the video timestamp;

retrieving a second audio frame from the audio file in response to determining that the audio timestamp is not greater than the video timestamp; and representing a length of a variable packet length field of a packet of the interleaved multimedia rule such that the length can be determined from one or more null numbers included within the variable packet length field.

14. In a computer having a processor and a memory, the computer useful in association with a web server coupled to a client computer via a network, a method for producing an interleaved multimedia file from a video file and an audio file, the method comprising:

retrieving a first video frame from a video file in response to determining that a video frame buffer is empty, the first video frame having a video timestamp;

retrieving a first audio frame from an audio file in response to determining that an audio frame buffer is empty, the first audio frame having an audio timestamp;

writing the first video frame to a first packet of the interleaved multimedia file in response to determining that the video timestamp is not greater than the audio timestamp;

retrieving a second video frame from the video file in response to determining that the video timestamp is not greater than the audio timestamp;

writing the first audio frame to a second packet of the interleaved multimedia file in response to determining that the audio timestamp is not greater than the video timestamp;

retrieving a second audio frame from the audio file in response to determining that the audio timestamp is not greater than the video timestamp;

writing a size of a variable packet length field of the first packet of the interleaved multimedia file to a length field of the variable packet length field of the first packet of the interleaved multimedia file; and writing at least one reserved value to the variable packet length field of the first packet of the interleaved multimedia file, a number of reserved values written being selected as a function of a size of the first video frame.

15. A producer useful for generating an interleaved multimedia file configured to provide a synchronized playback of a video file and an audio file on a client computer, the producer comprising:

a capture module configured to generate an interleaved multimedia file from video frames from the video file and audio frames from the audio file, based on timestamps of the video frames and the audio frames, the video frames and audio frames both having packets having variable packet length fields, the capture module configured to represent a length of a variable packet length field of a packet of the interleaved multimedia file such that the length can be determined from one or more null numbers included within the variable packet length field; and an author module configured to combine the interleaved multimedia file with a plurality of annotation frames based on the timestamps of the video frames, the audio frames, and the annotation frames.

16. A computer-readable medium useful in association with a computer system having a processor and a memory, the computer-readable medium having stored thereon computer-readable instructions configured to cause the computer system to, upon execution:

retrieve a first video frame from the video file in response to determining that a video frame buffer is empty, the first video frame having a video timestamp;

retrieve a first audio frame from the audio file in response to determining that an audio frame buffer is empty, the first frame audio having an audio timestamp;

write the first video frame to a first packet of an interleaved multimedia file in response to determining that the video timestamp is not greater than the audio timestamp;

retrieve a second video frame from the video file in response to determining that the video timestamp is not greater than the audio timestamp;

write the first audio frame to a second packet of the interleaved multimedia file in response to determining that the audio timestamp is not greater than the video timestamp;

retrieve a second audio frame from the audio file on response to determining that the audio timestamp is not greater than the video timestamp; and represent a length of variable packet length field of a packet of the interleaved multimedia file such that the length can be determined from one or more null numbers included within the variable packet length field.

* * * * *

UNITED STATES PATENT AND TRADEMARK OFFICE
CERTIFICATE OF CORRECTION

PATENT NO. : 6,449,653 B2
DATED : September 10, 2002
INVENTOR(S) : Klemets et al.

It is certified that error appears in the above-identified patent and that said Letters Patent is hereby corrected as shown below:

<u>Column 1,</u>
Lines 62 and 64, replace "include" with -- includes --.

<u>Column 4,</u>
Line 33, delete "a" between "over" and "network".

<u>Column 5,</u>
Line 53, replace "creating" with -- create --.

<u>Column 6,</u>
Line 31, replace "are" with -- is --.

<u>Column 7,</u>
Line 3, insert -- a -- between "enabling" and "viewer".
Line 3, delete "249" between "viewer" and "at".
Line 5, replace "include" with -- includes --.
Line 20, insert -- a -- between "that" and "viewer".
Line 23, replace "Viewer" with -- The viewer --.

<u>Column 8,</u>
Line 45, replace "broswer" with -- browser --.
Line 46, replace "begin" with -- begins --.

<u>Column 9,</u>
Line 25, insert -- the -- between "to" and "selected".
Line 29, replace "reconstructed" with -- reconstruct --.

<u>Column 10,</u>
Line 26, replace "are" with -- have --.

<u>Column 12,</u>
Line 37, insert -- field -- between "length" and "of".

<u>Column 13,</u>
Line 19, replace "the" with -- an --.
Lines 23 and 30, replace "upon" with -- in response to --.
Line 51, insert -- video -- before "frame".

UNITED STATES PATENT AND TRADEMARK OFFICE
CERTIFICATE OF CORRECTION

PATENT NO.     : 6,449,653 B2
DATED          : September 10, 2002
INVENTOR(S)    : Klemets et al.

It is certified that error appears in the above-identified patent and that said Letters Patent is hereby corrected as shown below:

Column 14,
Line 12, replace "number" with -- numbers --.
Line 12, replace "a" with -- the --.
Line 62, replace "the" with -- an --.

Column 15,
Line 47, replace "rule" with -- file --.
Line 55, replace "a" with -- the --.
Line 58, replace "an" with -- the --.

Column 16,
Line 47, replace "frame audio" with -- audio frame --.
Line 59, replace "on" with -- in --.
Line 62, insert -- a -- between "of" and "variable".

Signed and Sealed this

Twenty-fifth Day of February, 2003

JAMES E. ROGAN
*Director of the United States Patent and Trademark Office*